(12) United States Patent
Tatsui et al.

(10) Patent No.: US 8,507,136 B2
(45) Date of Patent: Aug. 13, 2013

(54) FUEL CELL SYSTEM

(75) Inventors: Hiroshi Tatsui, Shiga (JP); Kiyoshi Taguchi, Osaka (JP)

(73) Assignee: Panasonic Corporation, Osaka (JP)

( * ) Notice: Subject to any disclaimer, the term of this patent is extended or adjusted under 35 U.S.C. 154(b) by 260 days.

(21) Appl. No.: 13/057,657

(22) PCT Filed: Mar. 24, 2010

(86) PCT No.: PCT/JP2010/002092
§ 371 (c)(1),
(2), (4) Date: Feb. 4, 2011

(87) PCT Pub. No.: WO2010/109863
PCT Pub. Date: Sep. 30, 2010

(65) Prior Publication Data
US 2011/0143230 A1    Jun. 16, 2011

(30) Foreign Application Priority Data
Mar. 27, 2009    (JP) .................................. 2009-078441

(51) Int. Cl.
*H01M 8/06*    (2006.01)
(52) U.S. Cl.
USPC ........... 429/408; 429/416; 429/417; 429/423; 429/427; 429/443; 429/449
(58) Field of Classification Search
USPC ................. 429/408, 416–417, 420, 423–425, 429/427–439, 443, 449
See application file for complete search history.

(56) References Cited

U.S. PATENT DOCUMENTS

| | | |
|---|---|---|
| 6,294,149 B1 | 9/2001 | Autenrieth et al. |
| 2002/0150800 A1 | 10/2002 | Asou et al. |
| 2004/0043343 A1 | 3/2004 | Kamijo |
| 2004/0253493 A1 | 12/2004 | Kamijo |
| 2005/0130000 A1* | 6/2005 | Ojima et al. ................... 429/22 |
| 2007/0218330 A1* | 9/2007 | Naganuma ...................... 429/25 |
| 2008/0057359 A1* | 3/2008 | Venkataraman et al. ....... 429/13 |
| 2009/0123797 A1* | 5/2009 | Kaye et al. ...................... 429/17 |

(Continued)

FOREIGN PATENT DOCUMENTS

| | | |
|---|---|---|
| CN | 1487902 A | 4/2004 |
| DE | 112007000635 T5 | 1/2009 |

(Continued)

OTHER PUBLICATIONS

International Search Report for International Application No. PCT/JP2010/002092, dated Jul. 6, 2010, 2 pages.

(Continued)

*Primary Examiner* — Patrick Ryan
*Assistant Examiner* — Ben Lewis
(74) *Attorney, Agent, or Firm* — Brinks Hofer Gilson & Lione

(57) ABSTRACT

A fuel cell includes a reforming unit, a carbon monoxide decreasing unit, a fuel cell, a burner unit and a raw gas supply device. At the star-up operation of the fuel cell system, an amount of combustion air delivered to the burner unit by an air blower is adjusted according to a total amount of a raw gas to be supplied to the burner unit and an amount of a desorbed raw gas desorbed out of raw gas components adsorbed to at least one of catalysts in a fuel processor.

20 Claims, 14 Drawing Sheets

(56) References Cited

U.S. PATENT DOCUMENTS

| | | |
|---|---|---|
| 2009/0136801 A1 | 5/2009 | Ohkawara |
| 2010/0047636 A1 | 2/2010 | Tamura et al. |
| 2010/0203403 A1 | 8/2010 | Kani et al. |

FOREIGN PATENT DOCUMENTS

| | | |
|---|---|---|
| EP | 1316529 A1 | 6/2003 |
| JP | 2002-308602 A | 10/2002 |
| JP | 2004-284875 A | 10/2004 |
| JP | 2004-307236 A | 11/2004 |
| JP | 2005-050788 A | 2/2005 |
| JP | 2008-218355 A | 9/2008 |
| JP | 2008-288187 A | 11/2008 |
| WO | WO 2008/035776 A1 | 3/2008 |
| WO | WO 2009/004803 A1 | 1/2009 |

OTHER PUBLICATIONS

Extended European Search Report for European Application No. 10755665.6, dated Feb. 22, 2013, 7 pages.

Office Action from counterpart Chinese Application No. 201080002469.9, dated Nov. 29, 2012, 12 pages (with translation).

\* cited by examiner

FUEL CELL SYSTEM

This application is a 371 application of PCT/JP2010/002092 having an international filing date of Mar. 24, 2010, which claims priority to JP2009-078441 filed on Mar. 27, 2009, the entire contents of which are incorporated herein by reference.

TECHNICAL FIELD

The present invention relates to a fuel cell system configured to supply a reformed gas generated by reforming a hydrocarbon-based raw material to a fuel cell, thereby generating electric power.

BACKGROUND ART

A fuel cell supplies hydrogen or a hydrogen-rich gas to one of electrodes between which an electrolyte is interposed, and also supplies an oxidant gas, such as air containing oxygen, to the other of the electrodes, thereby generating electric power through an electrochemical reaction. Recently, attention is focused on a cogeneration system utilizes electric power generated by a fuel cell and also recovers heat that develops when the fuel cell generates electric power, to thus utilize the recovered heat as heat energy.

In the fuel cell system, as one method for generating a hydrogen-rich gas required for a fuel cell, a hydrocarbon raw gas, such as a town gas or an LPG, is subjected to steam reforming along with steam in a reforming unit filled with a reforming catalyst at about 700° C., thereby generating a reformed gas containing hydrogen as a major component. During the steam reforming, carbon monoxide in an amount of about 10% to 15% contained in the reformed gas output from the reforming unit is generated at this time as a by-product. Carbon monoxide poisons an electrode catalyst of the fuel cell, thereby deteriorating power generation capacity. For this reason, it is necessary to eliminate carbon monoxide in the reformed gas up to a concentration of 100 ppm or less and, preferably, 10 ppm or less.

Generally, a shift unit and a selective oxidation unit are provided as a carbon monoxide decreasing unit at a downstream of the reforming unit. The shift unit is filled with a shift catalyst. The shift catalyst causes carbon monoxide in a reformed gas output from the reforming unit to react with steam, thereby performing the water gas shift reaction to form hydrogen and carbon dioxide. The selective oxidation unit is filled with a selective oxidation catalyst. The selective oxidation catalyst is supplied air and a reformed gas of which carbon monoxide concentration has been decreased by the shift unit, thereby subjecting carbon monoxide and oxygen in the air to a selective oxidation reaction such that concentration of carbon monoxide in the reformed gas is decreased to 10 ppm or less. At this time, the shift unit performs the water gas sift reaction at a temperature of about 200° C. or more, and the selective oxidation unit performs the selective oxidation reaction at a temperature of about 100° C.

The reforming unit further includes a heating burner unit. During power generation of the fuel cell system, the burner unit burns hydrogen in the reformed gas that has not been used in power generation of the fuel cell (hereinafter described as an "off-gas") using the air supplied to the burner unit, thereby maintaining at about 700° C. the temperature of the reforming catalyst for a reforming reaction which is an endothermic reaction. Moreover, during a start-up operation of the fuel cell system, the burner unit burns a raw gas not yet used for generating hydrogen and a mixed gas containing the raw gas and hydrogen, thereby increasing the temperature of the reforming catalyst.

Hereinafter, a hydrogen production device in which a reforming unit equipped with the burner unit, the shift unit, and the selective oxidation unit are connected is described as a fuel processor, when necessary.

At the start-up operation of the fuel cell system, it is necessary to heat the catalysts in the fuel processor to predetermined temperatures for generating a reformed gas from the raw gas. There is disclosed a method which includes: supplying a raw gas to the fuel processor; returning the raw gas output from the fuel processor to the burner unit through a channel bypassing the fuel cell, thereby burning the gas; and heating the catalysts of the fuel processor by combustion heat (see, for example, Patent Document 1).

When power generation of the fuel cell system is halted, supply of the raw gas and steam to the reforming unit is suspended. An interior of the fuel processor is at this time depressurized by volume shrinkage due to a temperature fall of a reformed gas still remaining in the fuel processor and the condensation of steam in the reformed gas due to the temperature fall. In order to avoid such depressurization, when stopping operation, supply of the raw gas and the steam, is first suspended, and after the temperature of the fuel processor has fallen to a predetermined temperature, the reformed gas in the fuel processor is purged by the raw gas. When the internal pressure of the fuel processor has fallen to a predetermined pressure level or less, the raw gas is supplied to the fuel processor, thereby maintaining positive pressure (see, for example, Patent Document 2).

RELATED ART DOCUMENT

Patent Document

Patent Document 1: JP-A-2008-218355
Patent Document 2: JP-B-4130603

SUMMARY OF THE INVENTION

Problem to be Solved by the Invention

However, the related-art fuel cell systems have the following problems.

When stopping power generation, the related art fuel cell system supplies a raw gas, such as a town gas or an LPG, to the fuel processor in order to purge the reformed gas including steam within the fuel processor and keep internal pressure of the fuel processor at positive pressure. At this time, in association with the temperature fall of the catalysts during stoppage of the fuel cell system, a raw gas or some components of the raw gas are adsorbed to the respective catalysts.

In the meantime, temperatures of the respective catalysts increase to predetermined temperatures at the start-up operation of the fuel cell system. Hence, the raw gas is supplied to the burner unit through the fuel processor and burnt along with an air, thereby increasing the temperatures of the catalysts. With the temperature rise of the catalysts, the components of the raw gas adsorbed to the respective catalysts are desorbed and then supplied to the burner unit along with the raw gas supplied to the fuel processor. Therefore, an amount of raw gas actually supplied to the burner unit is larger than the amount of raw gas supplied to the fuel processor by an amount corresponding to the desorbed components of the raw gas. A ratio of the raw gas to air deviates, whereby incomplete combustion occurs in the burner unit. Further, carbon monoxide caused by incomplete combustion is emitted to the outside of the fuel cell system. In some cases, a flame vanish occurs in the burner unit. As a result, there arises a problem that the temperatures of the catalysts in the fuel processor are not increased, which impedes start-up operation of the fuel cell system.

An aspect of the present invention solves the problems of the related art, and an object thereof is to provide a fuel cell system capable of performing a stable start-up with stable combustion in a burner unit.

Means for Solving the Problem

In order to solve the problems of the related art, an aspect of the present invention provides a fuel cell system including: a reforming unit configured to subject a mixed gas containing a raw gas and steam to a reforming reaction by a reforming catalyst, thereby generating a reformed gas containing hydrogen; a carbon monoxide decreasing unit configured to allow the reformed gas generated by the reforming unit to contact a carbon monoxide decreasing catalyst, thereby decreasing carbon monoxide contained in the reformed gas; a fuel cell configured to generate electric power by hydrogen contained in the reformed gas passed through the carbon monoxide decreasing unit; a burner unit configured to burn at least one of an off-gas containing hydrogen not consumed in the fuel cell, the raw gas and the reformed gas using combustion air supplied by an air blower; and a raw gas supply device configured to supply the raw gas to the reforming unit and to the burner unit directly or through the reforming unit, wherein an amount of combustion air delivered to the burner unit by the air blower is adjusted at the start-up operation of the fuel cell system according to an amount of raw gas to be supplied by the raw gas supply device and burnt in the burner unit and an amount of a desorbed raw gas desorbed out of components of the raw gas adsorbed to at least one of the reforming catalyst and the carbon monoxide decreasing catalyst.

Accordingly, stable combustion of the burner unit can continually be performed at the start-up operation of the fuel cell system.

Advantages of the Invention

An aspect of the present invention can implement a fuel cell system capable of performing stable start-up operation by causing a burner unit to burn a raw gas, thereby increasing temperatures of catalysts in a fuel processor to predetermined temperatures.

MODE FOR CARRYING OUT THE INVENTION

Figure 1:
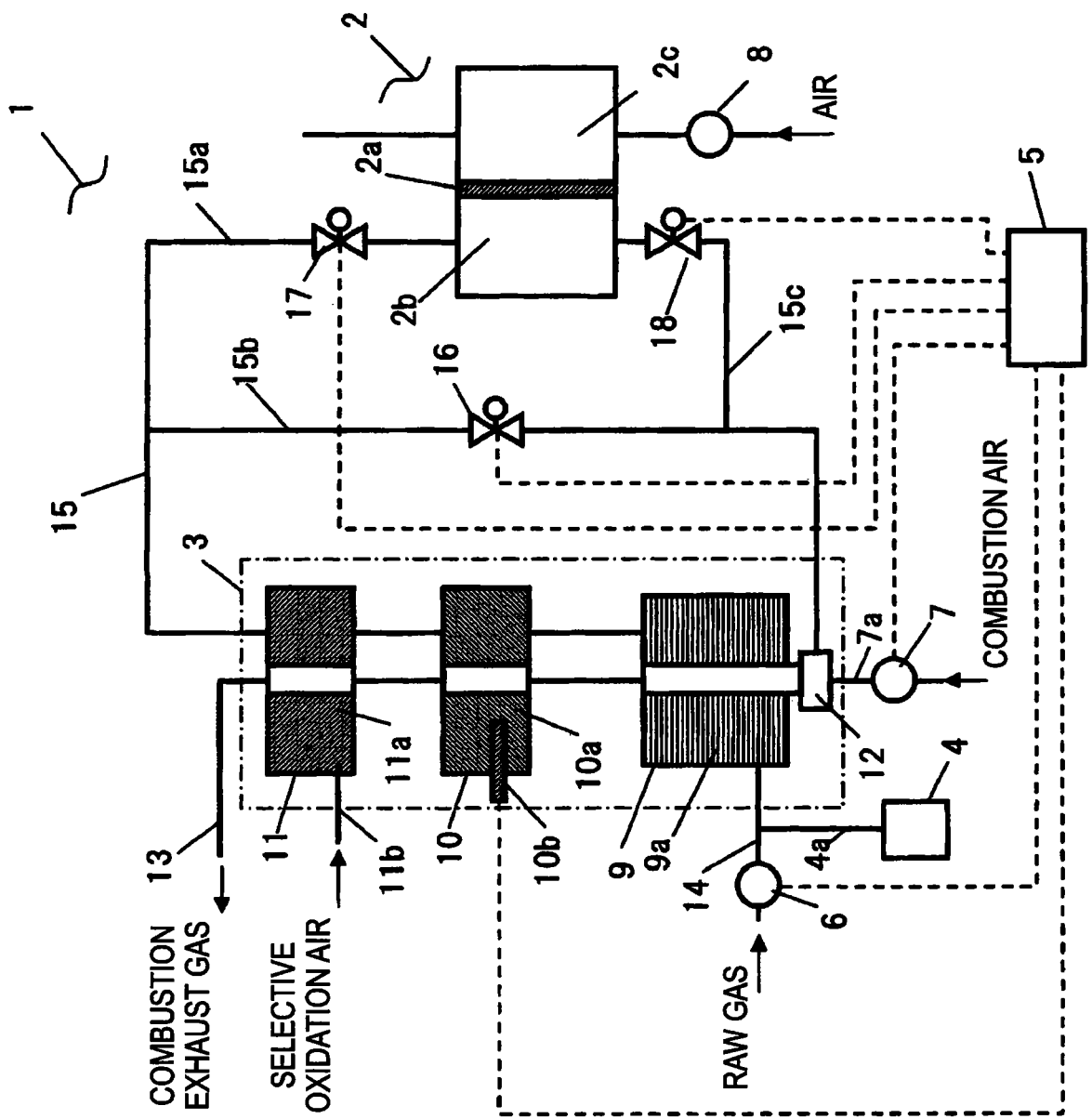
FIG. 1 is a schematic diagram showing a configuration of a fuel cell system according to a first embodiment of the present invention.

An aspect of the invention provides a fuel cell system comprises: a reforming unit configured to subject a mixed gas containing a raw gas and steam to a reforming reaction by a reforming catalyst, thereby generating a reformed gas containing hydrogen; a carbon monoxide decreasing unit configured to allow the reformed gas generated by the reforming unit to contact a carbon monoxide decreasing catalyst, thereby decreasing carbon monoxide contained in the reformed gas; a fuel cell configured to generate electric power by hydrogen contained in the reformed gas passed through the carbon monoxide decreasing unit; a burner unit configured to burn at least one of an off-gas containing hydrogen not consumed in the fuel cell, the raw gas and the reformed gas using combustion air supplied by an air blower; and a raw gas supply device configured to supply the raw gas to the reforming unit and to the burner unit directly or through the reforming unit, wherein an amount of combustion air delivered to the burner unit by the air blower is adjusted at the start-up operation of the fuel cell system according to an amount of raw gas to be supplied by the raw gas supply device and burnt in the burner unit and an amount of a desorbed raw gas desorbed out of components of the raw gas adsorbed to at least one of the reforming catalyst and the carbon monoxide decreasing catalyst.

By the configuration, a ratio of the amount of combustion air supplied to the burner unit to a total amount of a raw gas supplied from the raw gas supply device and a desorbed raw gas supplied by desorption is adjusted to a predetermined ratio, whereby the stable combustion can be performed. As a result, it is possible to provide a fuel cell system capable of performing a stable start-up operation by increasing the temperature of catalysts in the fuel processor to a predetermined temperature.

The fuel cell system according to the first invention may include heating means for heating at least one of the reforming catalyst and the carbon monoxide decreasing catalyst at the start-up operation of the fuel cell system.

With this configuration, the raw gas adsorbed to the catalysts can be effectively desorbed.

The fuel cell system may include measurement means for measuring at least a flow amount of the desorbed raw gas out of the raw gas supplied from the raw gas supply device to the burner unit and the desorbed raw gas at the start-up operation of the fuel cell system. Even when the raw gas adsorbed to at least one of the reforming catalyst and the carbon monoxide decreasing catalyst is desorbed and supplied to the burner unit, the amount of combustion air can be adjusted according to the flow amount of raw gas supplied to the burner unit. Hence, the burner unit can perform stable combustion.

In the fuel cell system, the measurement means may be a flow meter configured to measure at least the flow amount of the desorbed raw gas. The flow amount of raw gas supplied to the burner unit can be accurately measured with relative ease. Consequently, the amount of combustion air supplied to the burner unit can be adjusted according to the amount of raw gas supplied to the burner unit, and the burner unit can perform stable combustion.

In the fuel cell system, the measurement means may be a pressure gauge configured to detect at least pressure of the desorbed raw gas. Since the flow amount of the raw gas can be measured with a relatively simple configuration according to pressure of the raw gas supplied to the burner unit. Consequently, the flow amount of combustion air supplied to the burner unit can be adjusted according to the flow amount of raw gas supplied to the burner unit, whereby the burner unit can perform stable combustion.

The fuel cell system may include exhaust gas analysis means for detecting a concentration of at least one component out of combustion exhaust gas components generated after combustion in the burner unit, wherein the amount of combustion air may be adjusted according to the concentration detected by the exhaust gas analysis means.

With this configuration, it is possible to determine that a combustion state of the burner unit starts to be deteriorated due to the desorbed raw gas, and adjust the flow amount of combustion air. Consequently, the burner unit can perform stable combustion.

The fuel cell system may include one or more temperature sensors configured to detect at least one of a temperature of the reforming catalyst and a temperature of the carbon monoxide decreasing catalyst, wherein the amount of desorbed raw gas, which is desorbed out of the components of the raw gas adsorbed to at least one of the reforming catalyst and the carbon monoxide decreasing catalyst and which is to be burnt by the burner unit, may be estimated at the start-up operation of the fuel cell system based on at least one of the temperature of the reforming catalyst and the temperature of the carbon monoxide decreasing catalyst detected by the temperature sensor.

With this configuration, it is possible to estimate the amount of desorbed raw gas with a comparatively high degree of accuracy and by a simple configuration, and the burner unit can perform stable combustion.

The fuel cell system may include timer means for measuring a time elapsed since the heating means starts a heating operation, wherein the amount of the desorbed raw gas, which is desorbed out of the components of the raw gas adsorbed to at least one of the reforming catalyst and the carbon monoxide decreasing catalyst and which is to be burned by the burner unit, may be estimated based on the time measured by the timer means.

With this configuration, the amount of desorbed raw gas can thereby be detected by means of a simple configuration.

In the fuel cell system the heating means may start heating at least one of the reforming catalyst and the carbon monoxide decreasing catalyst at the start-up operation of the fuel cell system, and the raw gas supply device may be caused to operate after elapse of a predetermined time period since the heating means started heating operation.

With this configuration, it is possible to gently decrease a rate of temperature rise of the catalysts with combustion of a small amount of raw gas without decreasing the amount of raw gas supplied by the raw gas supply device. Further, even when the amount of raw gas adsorbed to the catalysts prior to the start-up operation of the fuel cell system is smaller than the estimated amount and even when a flame vanish occurs because the amount of the desorbed raw gas is smaller than the estimated amount in an estimated time period during which the burner unit burns only the desorbed raw gas, it is possible to prevent an excessive unburnt raw gas from being emitted to the outside of the fuel cell system through a combustion exhaust gas channel. Moreover, supplying the raw gas from the raw gas supply device is started after elapse of the predetermined period of time, whereby ignition can again be performed.

The fuel cell system may include one or more temperature sensors configured to detect at least one of a temperature of the reforming catalyst and a temperature of the carbon monoxide decreasing catalyst, wherein at the start-up operation of the fuel cell system, the heating means may start heating at least one of the reforming catalyst and the carbon monoxide decreasing catalyst, and wherein after the temperature detected by the temperature sensor becomes the predetermined temperature or more, the raw gas supply device may be activated.

With this configuration, it is possible to gently decrease a rate of temperature rise of the catalysts with combustion of a small amount of raw gas without decreasing the amount of raw gas supplied by the raw gas supply device. Further, even when the amount of raw gas adsorbed to the catalysts prior to the start-up operation of the fuel cell system is smaller than an estimated amount and even when a flame vanish occurs because the amount of the desorbed raw gas is smaller than the estimated amount in a estimated time period during which the burner unit burns only the desorbed raw gas, it is possible to detect occurrence of a flame vanish from the rate of temperature rise of the catalyst(s) detected by the temperature sensor.

In the fuel cell system, the raw gas supply device and the heating means may be activated at the start-up operation of the fuel cell system, after the burner unit burns the raw gas supplied from the raw gas supply device for a predetermined time period, operation of the raw gas supply device may be stopped, and the raw gas supply device may be activated after elapse of a predetermined period of time since the heating means starts heating operation. The raw gas supply device can supply the burner unit with a predetermined amount of raw gas regardless of the amount of the desorbed raw gas being desorbed from the catalysts. Therefore, the burner unit can perform stable ignition.

The fuel cell system may include one or more temperature sensors configured to detect at least one of a temperature of the reforming catalyst and a temperature of the carbon monoxide decreasing catalyst, wherein at the start-up operation of the fuel cell system, the raw gas supply device and the heating means may be activated, wherein after elapse of a predetermined period of time since the heating means started heating operation or after the temperature sensor detects a first predetermined temperature or more, operation of the raw gas supply device may be stopped, and wherein after the temperature sensor detects a second predetermined temperature or more, the raw gas supply device may be activated. Even when the amount of the desorbed raw gas desorbed from the catalysts is very small because of insufficient heating of the catalysts, the raw gas supply device can supply a predetermined amount of raw gas to the burner unit, and hence the burner unit can perform stable ignition.

In the fuel cell system, the heating means may include an electric heater. With this configuration, it is possible to relatively easily control initiation and completion of heating of the catalysts. Since the electric heater can easily control a heating rate thereof by controlling on/off control and control of an input voltage, it is possible to easily control the rate of temperature rise of the catalyst(s). As a result, by decreasing the rate of the temperature rise, it is possible to prevent deterioration of catalysts caused by sudden temperature changes. Conversely, by increasing the rate of temperature rise, it is possible to shorten a start-up time and control the amount of the desorbed raw gas desorbed from the catalysts.

In the fuel cell system, the heating means may include a heating burner unit, and at least one of the reforming unit and the carbon monoxide decreasing unit may be heated by a combustion exhaust gas of the heating burner unit. With this configuration, it is possible to effectively use an exhaust heat resulting from combustion of the heating burner unit for heating the catalyst(s). Therefore, a fuel cell system having a start-up characteristic with superior energy efficiency can be realized.

In the fuel cell system according to the fourteenth invention, the burner unit may be used as a heating burner unit. As a result, it is possible to reduce the number of the burner unit to one. In addition, pipes for supplying the raw gas and combustion air to the burner unit can also be simplified. Consequently, the burner unit serving as heating means can be realized by a simple configuration, and hence an increase in the size of the fuel cell system and complication of the system can be prevented.

Although embodiments of the present invention are herein described by reference to the drawings, a configuration that is the same as that of the previously described related art is assigned the same reference numeral, and its detailed explanation is omitted. The invention shall not be limited by the embodiments.

First Embodiment

FIG. 1 is a schematic diagram showing a configuration of a fuel cell system according to a first embodiment of the present invention.

As shown in FIG. 1, a fuel cell system 1 of an embodiment includes at least a fuel cell 2, a fuel processor 3, a steam generating device 4, a control unit 5, a raw gas supply device 6, a combustion air fan 7, and a cathode air blower 8. The combustion air fan 7 is an air blower configured to supply combustion air to a burner unit, described later. An LPG is utilized at this time as a raw gas supplied to the fuel cell system 1. An LPG cylinder (not shown) is connected to the raw gas supply device 6 outside of the fuel cell system 1. Another hydrocarbon-based material, such as a town gas, may also be used as the raw gas. A sulfur compound added to a hydrocarbon-based material as an odorant is eliminated when the raw gas passes through a desulfurization unit (not shown) placed at an upstream of the raw gas supply device 6 or between the raw gas supply device 6 and the fuel processor 3.

The fuel cell 2 has a structure in which a solid polyelectrolyte membrane 2a sandwiched between an anode electrode 2b and a cathode electrode 2c. The anode electrode 2b is supplied with a reformed gas including a large amount of hydrogen generated by the fuel processor 3, and the cathode electrode 2c is supplied with air by means of the cathode air blower 8, whereby electric power is generated.

The fuel processor 3 has a configuration in which a reforming unit 9 and a shift unit 10 and a selective oxidation unit 11, both of which make up a carbon monoxide decreasing unit, are connected in sequence. The reforming unit 9 is filled with a reforming catalyst 9a; the shift unit 10 is filled with a shift catalyst 10a; and the selective oxidation unit 11 is filled with a selective oxidation catalyst 11a.

The reforming unit 9 is provided with a burner unit 12. Hydrogen in the raw gas and hydrogen in an off-gas including hydrogen which has not been used for power generation by the fuel cell 2 are burnt along with the air blown to the burner unit 12 by the combustion air fan 7 by way of a combustion air channel 7a. A resultant combustion exhaust gas is emitted outside of the fuel cell system 1 by way of a combustion exhaust gas channel 13. The combustion exhaust gas channel 13 is laid so as to assume a configuration in which the channel runs from the burner unit 12 through a space of the reforming unit 9, a space of the shift unit 10, and a space of the selective oxidation unit 11 that are partitioned so as to prevent the channel from directly contacting with the reforming catalyst 9a, the shift catalyst 10a, and the selective oxidation catalyst 11a.

The raw gas supplied by the raw gas supply device 6, by way of a raw gas supply channel 14, into the space filled with the reforming catalyst 9a of the reforming unit 9 first passes through a layer filled with the reforming catalyst 9a. Next, the raw gas exits from the reforming unit 9 and is supplied to a space filled with the shift catalyst 10a of the shift unit 10, thereupon passing through a layer filled with the shift catalyst 10a. The raw gas exits from the shift unit 10 and is supplied to the space filled with the selective oxidation catalyst 11a of the selective oxidation unit 11, thereupon passing through a layer filled with the selective oxidation catalyst 11a. Subsequently, the raw gas is circulated so as to exit from the selective oxidation unit 11 to a raw gas channel 15 by way of the raw gas supply channel 14 and the raw gas channel 15.

The raw gas channel 15 has a structure such that the channel is bifurcated at an upstream of an entrance of the fuel cell 2 into a fuel cell entrance channel 15a and a fuel cell bypass channel 15b. The fuel cell entrance channel 15a is connected to the entrance of the anode electrode 2b of the fuel cell 2, and an off-gas channel 15c is connected to an exit of the anode electrode 2b. A side of the off-gas channel 15c not connected to the fuel cell 2 is connected to the fuel cell bypass channel 15b of the raw gas channel 15. Moreover, the fuel cell bypass channel 15b is provided with a fuel cell bypass valve 16; the fuel cell entrance channel 15a is provided with a fuel cell entrance valve 17; and the off-gas channel 15c is provided with a fuel cell exit valve 18. The control unit 5 controls opening and closing of the fuel cell bypass valve 16, the fuel cell entrance valve 17, and the fuel cell exit valve 18. The raw gas channel 15 is switched between the fuel cell entrance channel 15a and the fuel cell bypass channel 15b. Further, the raw gas channel 15 is connected to the burner unit 12 at a downstream position where the fuel cell bypass channel 15b and the off-gas channel 15c are connected to each other.

Further, the raw gas supply channel 14 is connected, as required, to a steam channel 4a for supplying steam from the steam generating device 4 to the reforming unit 9 while mixed in the raw gas.

The fuel processor 3 used in the fuel cell system of the first embodiment of the present invention is hereunder described by reference to FIG. 2.

Figure 2:
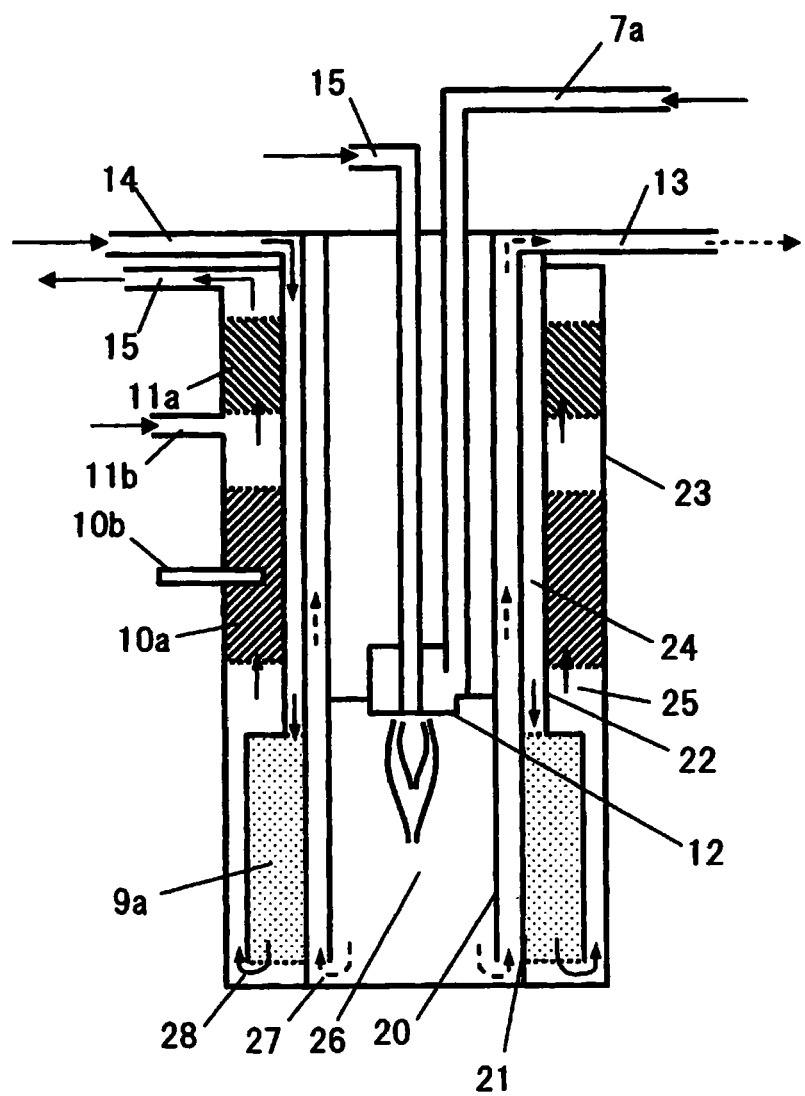
FIG. 2 is a cross-sectional view of a main portion for explaining a fuel processor used in the fuel cell system of the embodiment.

FIG. 2 is a cross-sectional view of a main portion for explaining the fuel processor 3 used in the fuel cell system of the first embodiment of the present invention.

As shown in FIG. 2, the fuel processor 3 has a first cylindrical body 20, a second cylindrical body 21, a third cylindrical body 22, and a fourth cylindrical body 23 that are arranged in sequence from inside and in a substantially concentric pattern. The combustion exhaust gas channel 13 is formed from a space between the first cylindrical body 20 and the second cylindrical body 21; a first gas channel 24 is formed into an annular shape within a space between the second cylindrical body 21 and the third cylindrical body 22; and a second gas channel 25 is formed from a space between the third cylindrical body 22 and the fourth cylindrical body 23. Moreover, disposed in an internal space of the first cylindrical body 20 are the burner unit 12, the raw gas channel 15 for supplying the burner unit 12 with a raw gas and an off-gas, the combustion air channel 7a, and a combustion chamber 26. The combustion chamber 26 and the combustion exhaust gas channel 13 are in mutual communication with each other by way of an exhaust return unit placed in the vicinity of an end of the combustion chamber and an end of the combustion exhaust gas channel. Likewise, the first gas flow channel 24 and the second gas flow channel 25 are in mutual communication with each other by way of a raw gas return unit 28 disposed in the vicinity of an end of the first gas flow channel 24 and an end of the second gas flow channel 25.

The first gas flow channel 24 is provided with the reforming unit 9 filled, for example, with the spherical reforming catalyst 9a in which an alumina carrier carries metal ruthenium. In addition to the metal ruthenium, a nickel catalyst, a platinum-based catalyst, a platinum-group catalyst, like rhodium, and the like, can also be used as the reforming catalyst 9a. Further, in addition to a sphere, another shape, like a cylindrical shape, can also be used as a shape of the reforming catalyst 9a.

The second gas flow channel 25 is also provided with the shift unit 10 filled, for example, with a Cu—Zn-based shift catalyst 10a (specifically MDC-7 manufactured by Sud-chemie Co., Ltd.), and the selective oxidation unit 11 filled, for example, with a spherical ruthenium-based selective oxidation catalyst 11a. A platinum-based catalyst other than those mentioned above can also be used as the shift catalyst 10a and the selective oxidation catalyst 11a.

The selective oxidation unit 11 is connected to a selective oxidation air supply channel 11b for causing the selective oxidation catalyst 11a to effect an oxidation reaction. Moreover, the raw gas supply channel 14 is connected to an upper portion of the first gas flow channel 24. Although the embodiment has been described by reference to an example that uses, as the selective oxidation unit 11, a selective oxidation unit 11 that decreases a concentration of carbon monoxide by means of a selective oxidation reaction, the concentration of carbon monoxide may also be decreased, for example, by a methanation reaction.

The shift unit 10 is provided with a shift temperature sensor 10b for measuring a temperature of the shift catalyst 10a. At the start-up operation of the fuel cell system 1, the shift temperature sensor 10b can also be used for a case where the control section 5 estimates an amount of a desorbed raw gas desorbed from the raw gas adsorbed to the shift catalyst 10a, according to a detected temperature of the shift catalyst 10a.

An exterior of the fuel processor 3 is covered with an unillustrated heat insulator. Thus, the fuel processor is provided so as to accomplish a temperature balance to be described later in consideration of heat insulation of units.

Figure 3:
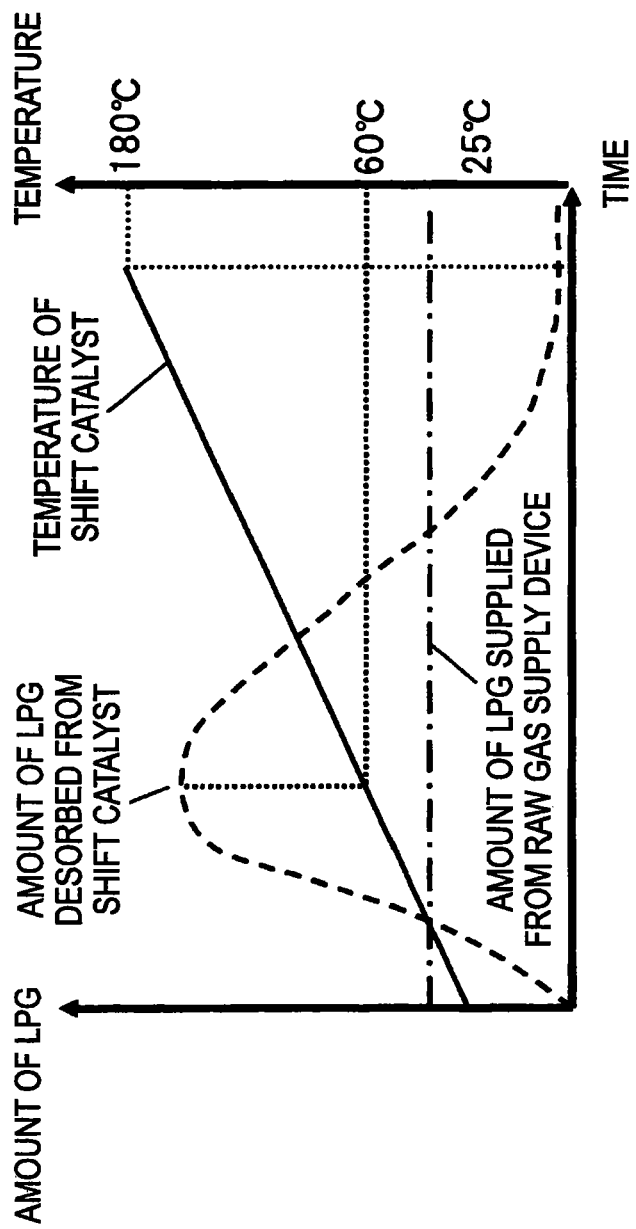
FIG. 3 is a graph showing a relationship between a temperature of a shift catalyst of a shift unit of the fuel cell system of the embodiment and an amount of raw gas desorbed from the shift catalyst.

By reference to FIG. 3, the following is provided for explaining the point of the embodiment; namely, a relationship between the temperature of the shift catalyst 10a of the shift unit 10 of the fuel cell system 1 and the amount of the desorbed raw gas desorbed from the shift catalyst 10a.

FIG. 3 is a graph showing a relationship between a temperature of the shift catalyst 10a of the shift unit 10 of the fuel cell system 1 of the first embodiment of the present invention and the amount of the desorbed raw gas desorbed from the shift catalyst 10a.

FIG. 3 shows a test result. Specifically, an experimentally produced fuel processor 3 in which only the shift unit 10 was filled with the shift catalyst 10a was used. A given amount of LPG was supplied from the raw gas supply device 6 directly to the burner unit 12 and burnt along with a predetermined combustion air. The temperature of the shift catalyst 10a and the amount of LPG that was a desorbed raw gas desorbed from the shift catalyst 10a, which were acquired when the shift catalyst 10a was heated by means of a combustion exhaust gas, were measured with elapse of time. In the following descriptions, the LPG that is a desorbed raw gas is hereunder provided, as required, as a desorbed LPG.

A horizontal axis of FIG. 3 represents a time elapsed since heating of the shift catalyst 10a was started; a first vertical axis of FIG. 3 represents a flow amount of an LPG; and a second vertical axis represents a temperature of the shift catalyst 10a. A broken line in FIG. 3 represents the amount of a desorbed LPG desorbed from the shift catalyst 10a, and a solid line represents the temperature of the shift catalyst 10a. In order to perform a comparison with the amount of the desorbed LPG desorbed from the shift catalyst 10a, the amount of LPG that is a raw gas supplied from the raw gas supply device 6 is designated by a dashed line in FIG. 3.

As shown in FIG. 3, when heating of the shift catalyst 10a was started, the temperature of the shift catalyst 10a that was nearly equal to an outside air temperature; namely, about 25° C., gradually increased at a substantially given rate. With an increase in the temperature of the shift catalyst 10a, desorption of the desorbed LPG desorbed from the shift catalyst 10a started, and the amount of the desorbed LPG kept increasing up to a temperature of about 60° C. Subsequently, the amount of the desorbed LPG gradually decreased during a period from when the temperature of the shift catalyst 10a increased until when the temperature reached about 180° C. However, the LPG was kept being discharged.

Accordingly, a correlation between the temperature of the shift catalyst 10a and the amount of the desorbed LPG desorbed from the shift catalyst 10a is stored in the control unit 5 as a calculation equation according to the test result shown in FIG. 3. The amount of the desorbed LPG is estimated from the temperature of the shift catalyst 10a detected by the shift temperature sensor 10b.

The control unit 5 thereby controls the amount of combustion air according to the amount of the desorbed LPG and the amount of LPG that is a raw gas supplied to the burner unit.

The amount of LPG adsorbed to the shift catalyst 10a changes according to the amount of the shift catalyst 10a to be filled and the shape and type of the shift catalyst 10a. The amount of LPG adsorbed to the shift catalyst 10a changes even when another hydrocarbon-based raw gas, such as a town gas, is used. Since the shift temperature sensor 10b measures the temperature of a portion of the shift catalyst 10*a*, the temperature of the shift catalyst and the amount of the desorbed raw gas change according to the position of the shift temperature sensor 10*b*. Consequently, in order to address the fact, it is important to previously determine a relationship between the temperature of the shift catalyst 10*a* and the amount of the desorbed raw gas desorbed from the shift catalyst 10*a* and to store the thus-determined relationship in the control unit 5.

Similar to the shift catalyst 10*a*, it is possible to measure the amount of the desorbed LPG desorbed from the reforming catalyst 9*a* and the selective oxidation catalyst 11*a* by heating the reforming catalyst 9*a* and the selective oxidation catalyst 11*a*. The relationship between the temperature of the reforming catalyst 9*a*, the temperature of the selective oxidation catalyst 11*a* and the amount of the desorbed LPG is stored in the control unit 5 according to a measurement result. The amount of the desorbed LPG desorbed from the reforming catalyst 9*a* and the selective oxidation catalyst 11*a* can thereby be estimated. However, the reforming catalyst 9*a* and the selective oxidation catalyst 11*a* used in the first embodiment adsorb very little LPG. When compared with the amount of LPG supplied from the raw gas supply device 6, the amount of the desorbed LPG desorbed with a temperature rise was insufficiently small. For this reason, control is performed while the amount of the desorbed raw gas desorbed from the shift catalyst 10*a* is taken as a main parameter.

Operation and an advantage of the fuel cell system 1 having the foregoing configuration are hereunder described by reference to FIGS. 1 and 2.

Operation of the fuel cell system 1 performed during normal power generation is first described.

First, the raw gas supply device 6 supplies the reforming unit 9 in which the temperature of the reforming catalyst 9*a* is maintained at about 700° C. with an LPG that is a raw gas mixed with the steam supplied from the steam generating device 4. A reformed gas including hydrogen, carbon monoxide, and steam is generated by means of a steam reforming reaction and by way of the reforming catalyst 9*a* of the reforming unit 9.

Next, the reformed gas exited from the reforming unit 9 is supplied to the layer filled with the shift catalyst 10*a* of the shift unit 10 and is circulated through the filled layer from down to up. By virtue of action of the shift catalyst 10*a* maintained at about 200 to 300° C., a shift reaction for generating carbon dioxide and hydrogen from the carbon monoxide and steam included in the reformed gas takes place at this time. The concentration of carbon monoxide in the reformed gas is thereby decreased to about 0.5% or less.

The reformed gas exited from the shift unit 10 is additionally supplied to the layer filled with the selective oxidation catalyst 11*a* of the selective oxidation unit 11 along with a small amount of air supplied by way of the selective oxidation air supply channel 11*b*, and the reformed gas is circulated through the filled layer from down to up. By virtue of action of the selective oxidation catalyst 11*a* maintained at about 100 to 200° C., the carbon monoxide in the reformed gas is subjected to oxidation at this time. The concentration of carbon monoxide in the reformed gas is further decreased to 10 ppm or less.

The reformed gas exited from the selective oxidation unit 11 passes through the raw gas channel 15 in which the fuel cell bypass valve 16 is closed and the fuel cell entrance valve 17 and the fuel cell exit valve 18 are open, to thus be supplied toward the anode electrode 2*b* of the fuel cell 2. The off-gas exhausted as a result of a portion of hydrogen in the reformed gas being consumed by power generation and the air supplied by the combustion air fan 7 are supplied to the burner unit 12, and the gas and the air are burnt by the burner unit 12. The reforming catalyst 9*a* is heated by combustion heat of the off-gas and maintained at about 700° C. The combustion exhaust gas circulates through the inside channel in the shift unit 10 and the selective oxidation unit 11, whereby the shift catalyst 10*a* is maintained at about 200 to 300° C., and the selective oxidation catalyst 11*a* is maintained at 150 to 200° C.

In the meantime, air is supplied toward the cathode electrode 2*c* of the fuel cell 2 by means of the cathode air blower 8. A portion of oxygen in the air is consumed by power generation, and exhaust air is caused to exit outside from the fuel cell system 1.

Electric power generated by the fuel cell 2 is consumed by an unillustrated external load.

Operation of the fuel cell system 1 performed during suspension of power generation is hereunder described.

First, after a connection between the fuel cell 2 and the external load is disconnected, the supply of air to the fuel cell 2 by the cathode air blower 8 and the supply of raw gas by the raw gas supply device 6 are stopped. Concurrently, the fuel cell bypass valve 16, the fuel cell entrance valve 17, and the fuel cell exit valve 18 are closed. The steam generating device 4 is simultaneously stopped at this time, whereby the supply of steam to the raw gas supply channel 14 by way of the steam channel 4*a* is also stopped.

Next, when the temperature of the reforming catalyst 9*a* is cooled to about 300° C. by outside air after elapse of a predetermined period of time, the fuel cell bypass valve 16 is closed, whereby the raw gas supply device 6 supplies an LPG, which is the raw gas, to the reforming unit 9, the shift unit 10, and the selective oxidation unit 11 in sequence. The reformed gas containing steam is thus purged to the respective layers filled with the respective catalysts. Since the temperature of the shift catalyst 10*a* and the temperature of the selective oxidation catalyst 11*a* are 100° C. or more at this time, the steam in the reformed gas will not condense on surfaces of the respective catalysts. Subsequently, after the LPG has been supplied for a predetermined period of time that makes it possible to sufficiently purge the reformed gas containing steam from the respective layers filled with the respective catalysts by means of the LPG, the fuel cell bypass valve 16 is closed, thereby stopping the raw gas supply device 6.

Further, when the fuel processor 3 becomes cold as a result of having dissipated heat for reasons of a difference between the temperature of the fuel processor and a temperature of an ambient atmosphere, internal pressure of the fuel processor 3 decreases for reasons of volume shrinkage of the LPG heated in the fuel processor 3. However, the raw gas supply device 6 supplies the LPG at predetermined times, whereupon the internal pressure of the fuel processor 3 is maintained at positive pressure. Operation for supplying the fuel processor 3 with an LPG for the purpose of maintaining the internal pressure at positive pressure is hereunder described as pressure keeping operation, as required.

By means of purging and pressure keeping operations, the shift catalyst 10*a* sufficiently adsorbs the LPG after the temperature has dropped. Since in reality the town gas and the LPG are a mixed gas containing hydrocarbon-based gas components, such as methane and propane, ease of adsorption to the catalyst changes according to the respective hydrocarbon-based gases. Specifically, a hydrocarbon-based gas component of higher molecular weight tends to be adsorbed more easily than a hydrocarbon-based gas component of smaller molecular weight. However, since propane serving as a main component accounts for about 98% of the composition of the LPG employed in the present embodiment, there will arise no problem even when the LPG is handled as a gas substantially containing a single component, or propane. Accordingly, a component of the raw gas adsorbed to the shift catalyst 10a is also described as a raw gas.

Start-up operation of the fuel cell system of the present embodiment is hereunder described by reference to the drawings.

Figure 4:
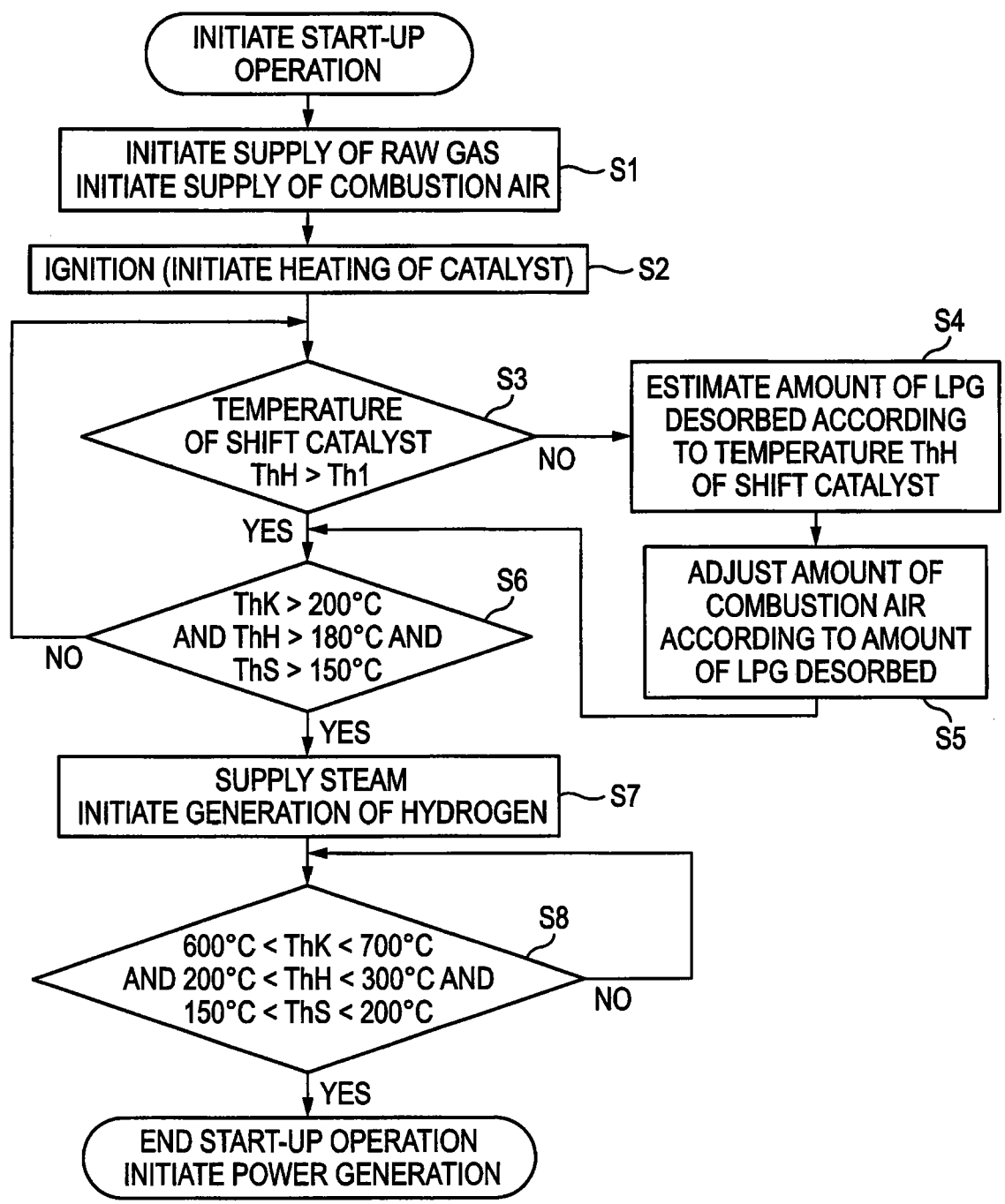
FIG. 4 is a flowchart showing control flow of the main portion at the start-up operation of the fuel cell system of the embodiment.

FIG. 4 is a flowchart showing control flow of a main portion at the start-up operation of the fuel cell system of the first embodiment of the present invention.

As shown in FIG. 4, the fuel cell bypass valve 16 is first opened at the start-up operation of the fuel cell system 1, and the raw gas supply device 6 supplies the reforming unit 9 with a predetermined amount of LPG that is a raw gas (step S1). Subsequently, the LPG circulates through the shift unit 10 and the selective oxidation unit 11 in sequence and is supplied to the burner unit 12 by way of the fuel cell bypass channel 15b of the raw gas channel 15. Concurrently, the combustion air fan 7 sends the burner unit 12 with an amount of air commensurate with the flow amount of LPG supplied by the raw gas supply device 6 (step S1), whereby the LPG is ignited by an igniter (step S2).

When the burner unit 12 starts combustion of the LPG, resultant heat heats the reforming catalyst 9a of the reforming unit 9, whereupon the temperature (TkK) of the reforming catalyst 9a increases. Concurrently, a combustion exhaust gas passes through the combustion exhaust gas channel 13 in the shift unit 10 and the selective oxidation unit 11 in sequence, whereby the shift catalyst 10a and the selective oxidation catalyst 11a are heated. The temperature (ThH) of the shift catalyst 10a and a temperature (ThS) of the selective oxidation catalyst 11a increase.

Next, the shift temperature sensor 10b detects the temperature (ThH) of the shift catalyst 10a, thereby performing a comparison (step S3). At this time, when the temperature (ThH) of the shift catalyst 10a is lower than a predetermined temperature (Th1) (No in step S3), the amount of the desorbed LPG which would be desorbed from the LPG adsorbed to the shift catalyst 10a is estimated on the basis of the information stored in the control unit 5 (step S4). The amount of combustion air supplied to the burner unit 12 by the combustion air fan 7 is adjusted so as to become commensurate with a total amount of the LPG supplied by the raw gas supply device 6 and the desorbed LPG that would be desorbed (an estimated value) (step S5).

The amount of combustion air commensurate with the flow amount of LPG described in connection with step S1 and step S5 is a predetermined multiple of the amount of air including the amount of oxygen sufficient for completely burning the LPG supplied to the burner unit 12, to thus split the LPG into carbon dioxide and water (steam). A ratio of the amount of air to the amount of LPG is hereunder described as an air-fuel ratio. Specifically, for example, an air-fuel ratio of 1.0 is a ratio at which, when oxygen in a supplied air and LPG are ideally burnt, the LPG is split into carbon dioxide and water in just proportion. For example, an air-fuel ratio of 2.0 is a ratio at which one-half of the oxygen in the supplied air is unused for combustion and still remains in a combustion exhaust gas.

In the fuel cell system 1 of the present embodiment, the air-fuel ratio in steps S1 and S5 is set to 2.5 to 3.0. If the air-fuel ratio is too large or small, ignitability will be deteriorated. Even if the LPG is ignited, incomplete combustion will take place, thereby producing carbon monoxide. The carbon monoxide will be discharged outside of the fuel cell system as a combustion exhaust gas, which will cause a flame vanish.

In this case, regulating the amount of combustion air according to the temperature detected by the shift temperature sensor 10b (step S5) is continually performed until the temperature (ThH) of the shift catalyst 10a comes to the predetermined temperature (Th1) or more (Yes in step S3), the temperature (ThK) of the reforming catalyst 9a comes to 200° C. or more; the temperature (ThH) of the shift catalyst 10a comes to 180° C. or more; and the temperature (ThS) of the selective oxidation catalyst 11a comes to 150° C. or more (Yes in step S6).

Next, when the temperature (ThK) of the reforming catalyst 9a comes to 200° C. or more; the temperature (ThH) of the shift catalyst 10a comes to 180° C. or more; and the temperature (ThS) of the selective oxidation catalyst 11a comes to 150° C. or more (Yes in step S6), and there is started supply of steam from the steam generating device 4 to the raw gas supply channel 14 by way of the steam channel 4a. A mixed gas containing LPG and steam is supplied to the layer filled with the reforming catalyst 9a of the reforming unit 9, whereupon reforming the LPG into hydrogen is initiated (step S7). The amount of combustion air is adjusted such that the air-fuel ratio comes to 1.5 to 2.0. If steam is supplied when the temperature of the reforming catalyst 9a, the temperature of the shift catalyst 10a, and the temperature of the selective oxidation catalyst 11a do not exceed 100° C., the steam will condense, which may hinder a gas flow. For this reason, the requirements for selection of Yes in step S6; namely, the temperature (ThK) of the reforming catalyst 9a being 200° C. or more, the temperature (ThH) of the shift catalyst 10a being 180° or more, and the temperature (ThS) of the selective oxidation catalyst 11a being 150° C. or more, are temperatures of the temperature sensor at which all of the catalysts having respective temperature distributions come to 100° C. or more. If steam is not supplied when the temperature of the reforming catalyst 9a exceeds 400° C., carbon will be deposited on the surface of the reforming catalyst, which may deteriorate the function of the catalyst. For this reason, there is needed a design consideration in such a way that the temperature (ThH) of the shift catalyst 10a and the temperature (ThS) of the selective oxidation catalyst 11a exceed 100° C. before the temperature (ThK) of the reforming catalyst 9a exceeds 400° C.

A determination is now made as to whether or not the respective catalysts are at respective predetermined temperatures; namely, whether or not the reforming catalyst 9a falls in a temperature range from about 600 to 700° C.; whether or not the shift catalyst 10a falls within a temperature range from about 200 to 300° C.; and whether or not the selective oxidation catalyst 11a falls within a temperature range from about 150 to 200° C. (step S8). When the temperatures of the respective catalysts are lower than their respective temperature ranges (No in step S8), reactions of the respective catalysts are insufficient. Namely, since the amount of hydrogen in the reformed gas is small and since the amount of carbon monoxide is large, the reformed gas that is still in the course of temperature rise is caused to circulate through the fuel cell bypass channel 15b. When the temperatures of the respective catalysts have increased to the respective predetermined temperature ranges (Yes in step S8), the fuel cell bypass valve 16 is closed after the components of the reformed gas have become stable. Concurrently, the reformed gas is supplied to the anode electrode 2b of the fuel cell 2 by opening the fuel cell entrance valve 17 and the fuel cell exit valve 18, and power generation is initiated. When the temperatures of the respective catalysts are outside the respective temperature ranges (No in step S8), control similar to that performed in the related art is performed, and processing waits until the temperatures fall in the respective temperature ranges.

As mentioned above, according to the fuel cell system 1 of the first embodiment, desorption of the raw gas which would be caused by an increase in the temperature of the shift catalyst 10a at the start-up operation is estimated according to the temperature of the shift catalyst 10a detected by the shift temperature sensor 10b. Combustion air is supplied to and burnt in the burner unit 12 such that a predetermined air-fuel ratio is achieved at a total of the estimated amount of the desorbed gas and the amount of supplied raw gas. As a consequence, stable combustion is effected while occurrence of incomplete combustion is suppressed, and start-up operation of the fuel cell system 1 can be performed reliable.

Figure 5:
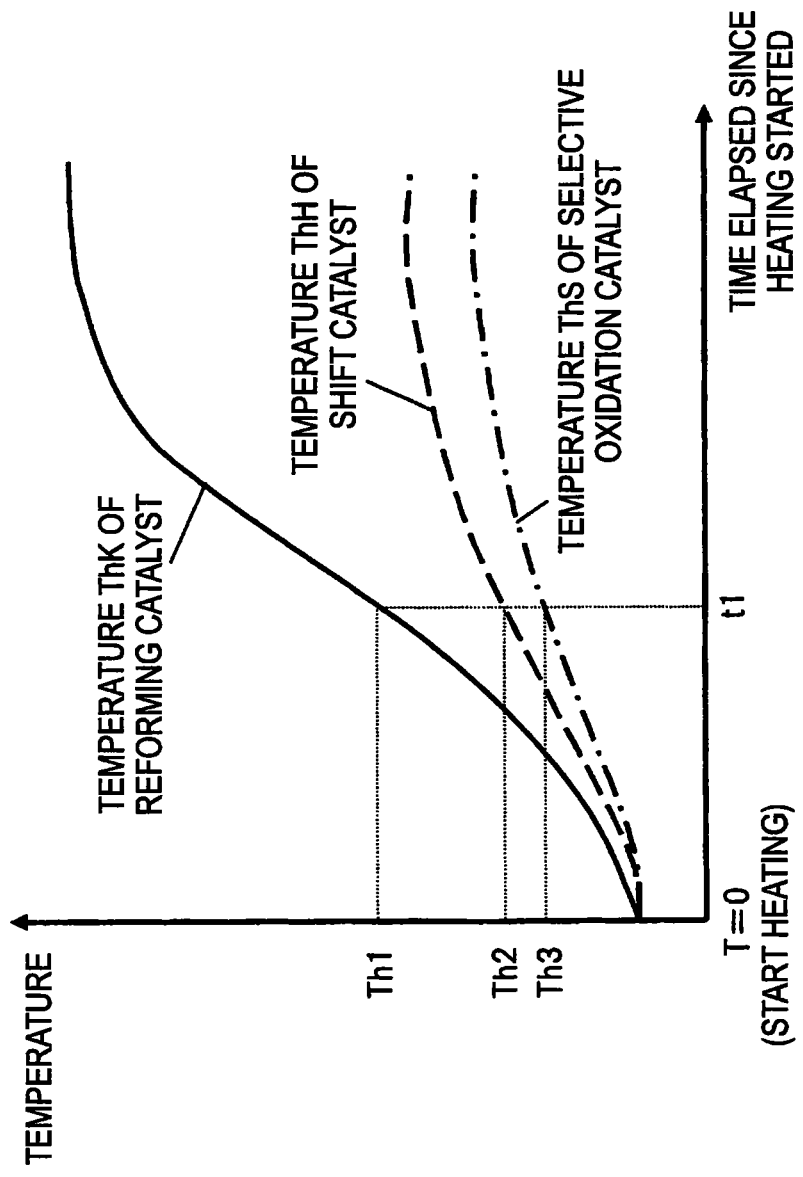
FIG. 5 is a characteristic graph showing how a temperature of a reforming catalyst, a temperature of the shift catalyst, and a temperature of a selective oxidation catalyst increase at the start-up operation of the fuel cell system of the embodiment.

The fuel cell system 1 of the first embodiment has been described by reference to the example in which the amount of the desorbed LPG desorbed from the shift catalyst 10a at the start-up operation of the fuel cell system 1 is estimated according to a value of the shift temperature sensor 10b that detects the temperature of the shift catalyst 10a. However, the fuel cell system is not limited to such an example. For example, as shown in FIG. 5, the temperature of the shift catalyst 10a is estimated by means of a timer that measures a time (t1) elapsed since heating was started. The amount of the desorbed LPG desorbed from the shift catalyst 10a can also be further estimated from the thus-estimated temperature. A method for assuming the amount of LPG is hereunder described specifically by reference to FIG. 5.

FIG. 5 is a characteristic plot showing how the temperature of the reforming catalyst 9a, the temperature of the shift catalyst 10a, and the temperature of the selective oxidation catalyst 11a increase at the start-up operation of the fuel cell system 1 of the embodiment.

As shown in FIG. 5, the temperature (ThK) of the reforming catalyst 9a, the temperature (ThH) of the shift catalyst 10a, and the temperature (ThS) of the selective oxidation catalyst 11a are determined from the time (t1) elapsed since heating of the reforming catalyst 9a, the shift catalyst 10a, and the selective oxidation catalyst 11a was initiated. First, at the start-up operation of the fuel cell system, the timer measures the time (t1) elapsed since heating was started, thereby assuming the temperature of the shift catalyst 10a achieved at that time. The amount of the desorbed LPG desorbed from the shift catalyst 10a is estimated according to the temperature of the shift catalyst 10a. The amount of combustion air is adjusted and controlled on the basis of the assumption by way of the control unit 5. In this case, the temperature (ThH) of the shift catalyst 10a at the start of heating must be known. However, a temperature measured by the temperature sensor that measures the temperature of the reforming catalyst 9a or a temperature measured by the temperature sensor that measures the temperature of the selective oxidation catalyst 11a can substitute for the temperature (ThH).

The fuel cell system 1 of the present embodiment has been described by means of the example in which there is provided the shift temperature sensor 10b for detecting the temperature (ThH) of the shift catalyst 10a. There are provided no descriptions about means for detecting the temperature (ThK) of the reforming catalyst 9a and the temperature (ThS) of the selective oxidation catalyst 11a. However, a reform temperature sensor for detecting the temperature of the reforming catalyst 9a and a selective oxidation temperature sensor for detecting the temperature of the selective oxidation catalyst 11a may also be separately provided. Alternatively, the temperature of the reforming catalyst 9a and the temperature of the selective oxidation catalyst 11a can also be detected from the temperature of the shift catalyst 10a detected by the shift temperature sensor 10b.

Another start-up operation method for the fuel cell system 1 of the first embodiment of the present invention is hereunder described by reference to FIG. 6.

Figure 6:
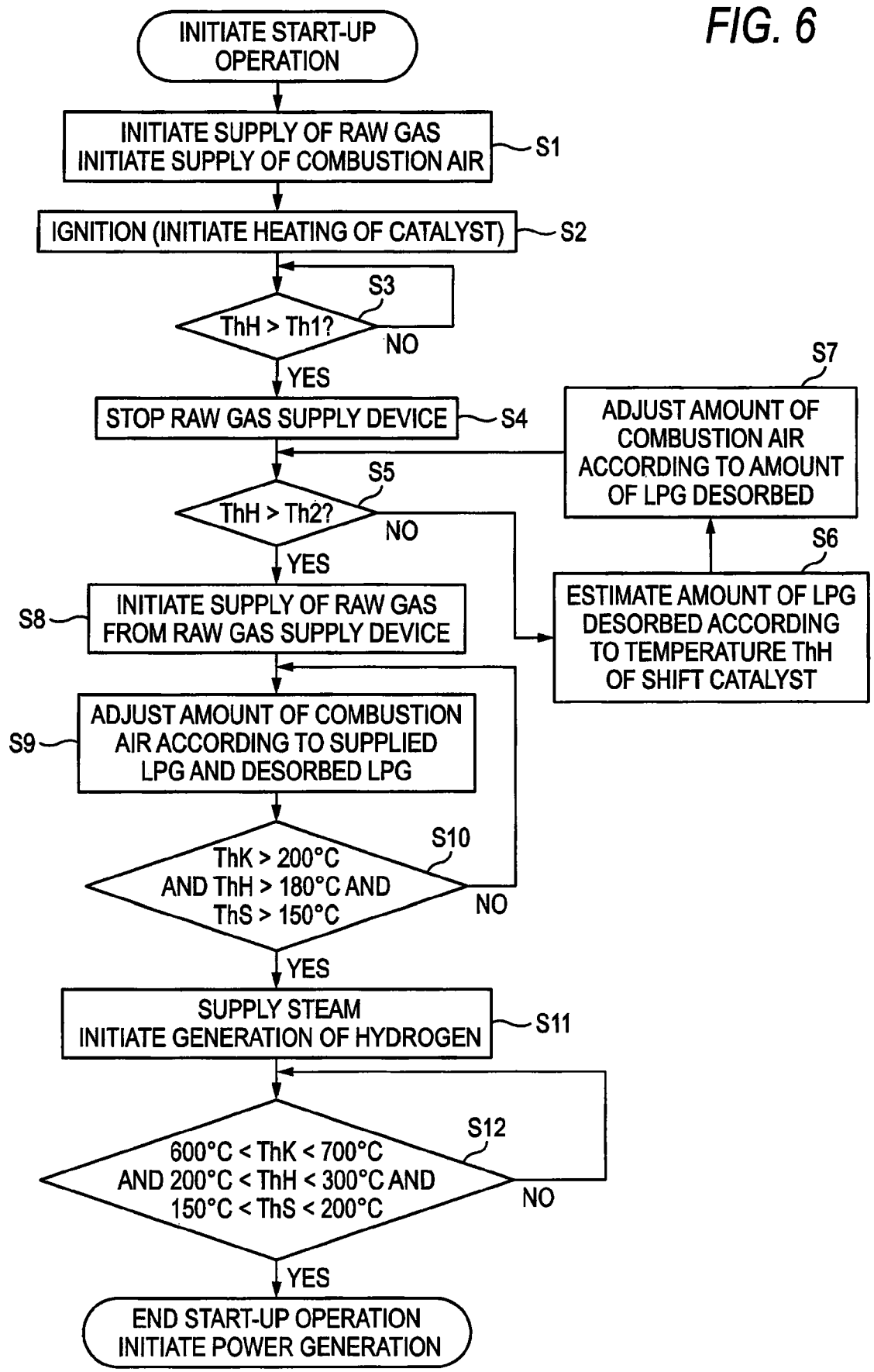
FIG. 6 is a flowchart for explaining control flow of the main portion in another method relating to start-up operation of the fuel cell system of the present embodiment.

FIG. 6 is a flowchart for describing control flow of the main portion in another start-up operation method for the fuel cell system 1 of the first embodiment of the present invention.

As shown in FIG. 6, the fuel cell bypass valve 16 is first opened at the start-up operation of the fuel cell system 1, thereby activating the raw gas supply device 6 and the combustion air fan 7, to thus supply the LPG, which is the raw gas, and air (step S1). The LPG and the combustion air supplied to the burner unit 12 are ignited by the igniter (step S2). Thereby, combustion of the LPG starts in the burner unit 12, so that the temperature (ThH) of the shift catalyst 10a thereupon increases.

The temperature (ThH) of the shift catalyst 10a and the predetermined temperature (Th1) are compared with each other (step S3). When the temperature (ThH) of the shift catalyst 10a has exceeded the predetermined temperature (Th1) (Yes in step S3), the raw gas supply device 6 comes to a stop (step S4). Supply of the LPG, which is the raw gas, from the raw gas supply device 6 to the burner unit 12 is stopped at this time. However, the desorbed LPG desorbed from the shift catalyst 10a has already been supplied to the burner unit 12, so that combustion continues.

The temperature (ThH) of the shift catalyst 10a and a predetermined temperature (Th2) are now compared to each other (step S5). When the temperature (ThH) of the shift catalyst 10a is lower than the predetermined temperature (Th2) (No in step S5), the control unit 5 estimates an amount of the desorbed LPG desorbed from the LPG adsorbed to the shift catalyst 10a (step S6). The amount of combustion air supplied to the burner unit 12 by the combustion air fan 7 is adjusted so as to become commensurate with the amount of the desorbed LPG desorbed from the shift catalyst 10a (step S7).

When the temperature (ThH) of the shift catalyst 10a exceeds the predetermined temperature (Th2) (Yes in step S5), the raw gas supply device 6 is again activated, thereby supplying the burner unit 12 with the LPG from the raw gas supply device 6 (step S8). The amount of combustion air supplied to the burner unit by the combustion air fan 7 is adjusted, at this time, so as to become commensurate with a total amount of LPG supplied by the raw gas supply device 6 and the desorbed LPG (step S9).

Regulating the amount of combustion air according to the temperature detected by the shift temperature sensor 10b (step S9) is continually performed until the temperature (ThK) of the reforming catalyst 9a comes to 200° C. or more; the temperature (ThH) of the shift catalyst 10a comes to 180° C. or more; and the temperature (ThS) of the selective oxidation catalyst 11a comes to 150° C. or more (Yes in step S10).

When the temperature (ThK) of the reforming catalyst 9a has come to 200° C. or more; the temperature (ThH) of the shift catalyst 10a has come to 180° C. or more; and the temperature (ThS) of the selective oxidation catalyst 11a has come to 150° C. or more (Yes in step S10), the steam generating device 4 starts supplying steam to the raw gas supply channel 14 by way of the steam channel 4a. The mixed gas containing an LPG and steam is supplied to the layer filled with the reforming catalyst 9a of the reforming unit 9, whereupon reforming the LPG to hydrogen is initiated (step S11). The amount of combustion air is adjusted such that the air-fuel ratio comes to 1.5 to 2.0.

A determination is now made as to whether or not the respective catalysts are at respective predetermined temperatures; namely, whether or not the reforming catalyst 9a falls in a temperature range from about 600 to 700° C.; whether or not the shift catalyst 10a falls within a temperature range from about 200 to 300° C.; and whether or not the selective oxidation catalyst 11a falls within a temperature range from about 150 to 200° C. (step S12). When the temperatures of the respective catalysts are lower than their respective temperature ranges (No in step S12), reactions in the respective catalysts are insufficient. Namely, the amount of hydrogen in the reformed gas is small, and the amount of carbon monoxide in the gas is large. Therefore, the reformed gas that is in the course of temperature rise is caused to circulate through the fuel cell bypass channel 15b. When the temperatures of the respective catalysts have increased to the their predetermined temperature ranges (Yes in step S12), the fuel cell bypass valve 16 is closed after the components of the reformed gas have become stable. Concurrently, the reformed gas is supplied to the anode electrode 2b of the fuel cell 2 by opening the fuel cell entrance valve 17 and the fuel cell exit valve 18, and power generation is initiated.

As has been described above, under another start-up operation method for the fuel cell system 1 of the first embodiment, the increase in the temperatures of the respective catalysts can be made milder, before step S8 shown in FIG. 6, than the rise in the temperatures of the respective catalysts shown in FIG. 5. It is thereby possible to prevent occurrence of temperature distributions (variations) of the respective layers filled with the respective catalysts. It becomes possible to prevent deterioration, which would otherwise be caused by sharp temperature changes in the respective catalysts and in the respective cylindrical bodies making up the fuel processor 3.

During control of the other start-up operation of the first embodiment, after the temperature of the shift catalyst 10a has reached the predetermined temperature Th1, the raw gas supply device stops supplying the LPG. However, the control operation is not limited to this. For example, as is obvious from the relationship between the time elapsed since heating was started and the temperature of the shift catalyst 10a, which is shown in FIG. 5, the raw gas supply device 6 can also stop supplying LPG after elapse of a predetermined time since heating of the shift catalyst 10a was started.

The fuel cell system 1 of the first embodiment has been described by reference to the example configuration in which the raw gas to be burnt by the burner unit 12 at the start-up operation of the fuel cell system 1 is supplied to the burner unit 12 by way of the fuel processor 3. However, the configuration is not limited to the example. For example, there may also be adopted a configuration that is equipped with a channel (not shown) that supplies the raw gas directly to the burner unit 12 from the raw gas supply device and in which the raw gas is supplied directly to the burner unit 12 at the start-up operation of the fuel cell system 1, to thus burn the raw gas. In order to prevent a pressure increase, which would otherwise be caused by an increase in temperature of the fuel processor 3, the raw gas channel must be, at this time, brought into communication from the fuel processor 3 to the burner unit 12. In the case of the configuration mentioned above, a similar advantage can also be yielded by estimating the amount of the desorbed raw gas desorbed from the respective catalysts and regulating the amount of combustion air.

The embodiment has been described by taking, as an example, the fuel cell system 1 that takes only the amount of the desorbed raw gas desorbed from the shift catalyst 10a as a target and that adjusts the amount of combustion air. The reason for this is that the example is based on a test result showing that the amount of LPG, which is the raw gas, adsorbed to the reforming catalyst 9a and the selective oxidation catalyst 11a used in the first embodiment is very small and that the influence on the air-fuel ratio imposed by the amount of adsorbed LPG is sufficiently small.

However, when a type of a raw gas and types and shapes of catalysts change, the raw gas is usually adsorbed by the reforming catalyst 9a and the selective oxidation catalyst 11a other than the shift catalyst 10a. There is a case where the influence of the amount of the desorbed raw gas desorbed on the air-fuel ratio increases with an increase in temperature. In this case, the amount of the desorbed raw gas desorbed with an increase in the temperature of the catalyst is experimentally determined for each of the reforming unit 9, the shift unit 10, and the selective oxidation unit 11. An amount of the desorbed raw gas desorbed from a catalyst at the start-up operation of the fuel cell system 1 is estimated from the temperature of an individual catalyst. The amount of combustion air may also be adjusted and controlled such that an air-fuel ratio comes to a predetermined ratio with respect to the total amount of the desorbed raw gas desorbed from the respective catalysts and the amount of raw gas supplied from the raw gas supply device. There can be implemented a fuel cell system that prevents occurrence of incomplete combustion, that enables reliable start-up operation, and that exhibits superior reliability.

Second Embodiment

Figure 7:
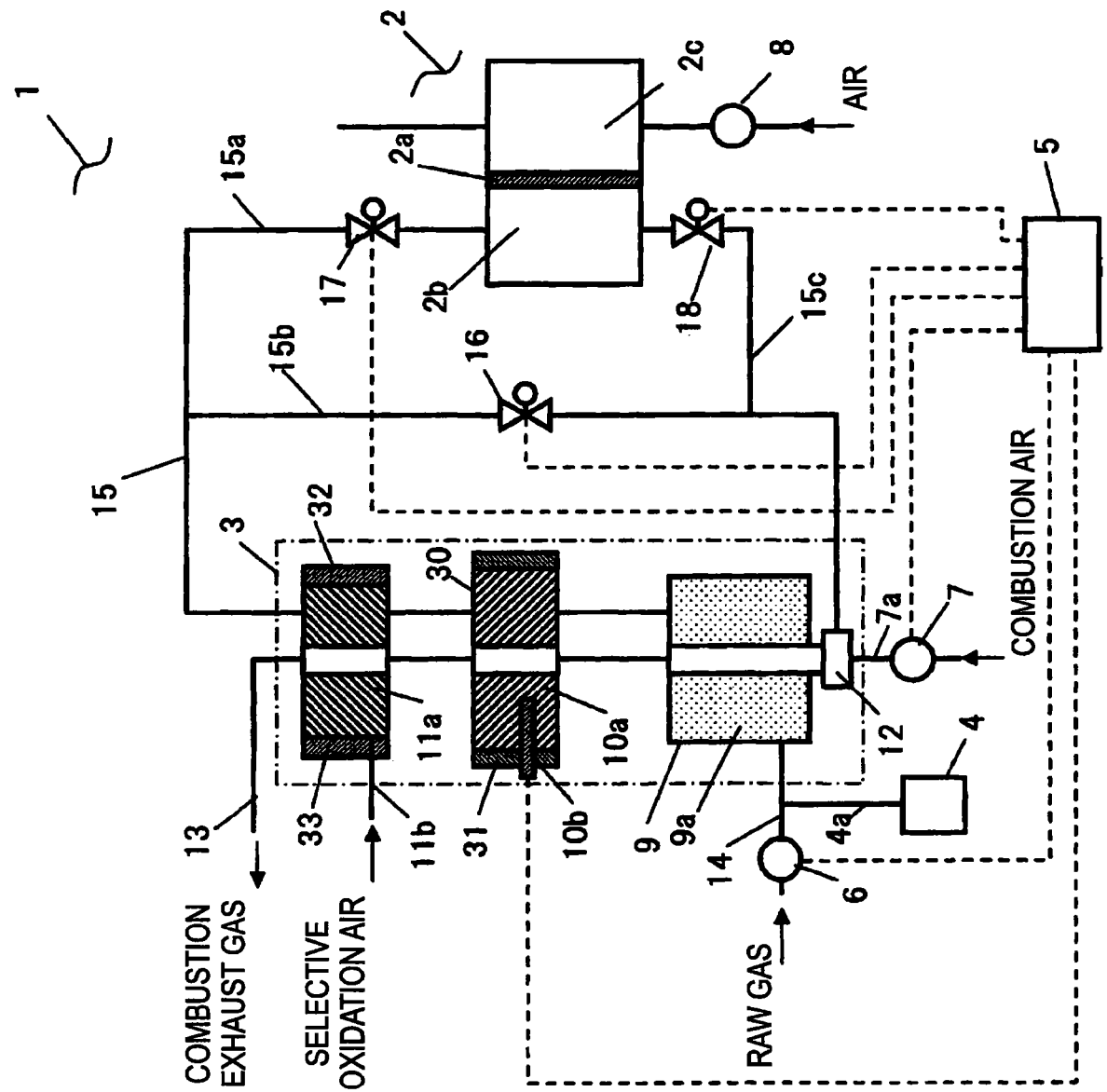
FIG. 7 is a schematic diagram showing a configuration of a fuel cell system according to a second embodiment of the present invention.

FIG. 7 is a schematic diagram showing a configuration of the fuel cell system 1 of a second embodiment of the present invention. In FIG. 7, constituent elements that are the same as those shown in FIG. 1 are assigned the same reference numerals, and their explanations are omitted here for brevity.

As shown in FIG. 7, the fuel cell system 1 of the present embodiment differs from the fuel cell system 1 of the first embodiment in that a shift unit 30 of the fuel cell system 1 described in connection with the first embodiment is provided with a shift heater 31 and that a selective oxidation unit 32 is provided with a selective oxidation heater 33.

As shown in FIG. 7, the fuel cell system 1 of the second embodiment is configured such that the shift heater 31 is provided outside of the shift unit 30 where the shift heater 31 does not contact the shift catalyst 10a and that the selective oxidation heater 33 is provided outside of the selective oxidation unit 32 where the selective oxidation heater 33 does not contact the selective oxidation catalyst 11a. The shift heater 31 and the selective oxidation heater 33 are, for example, electric heaters that produce heat upon application of electric power, thereby heating the shift unit 30 and the selective oxidation unit 32.

Figure 8:
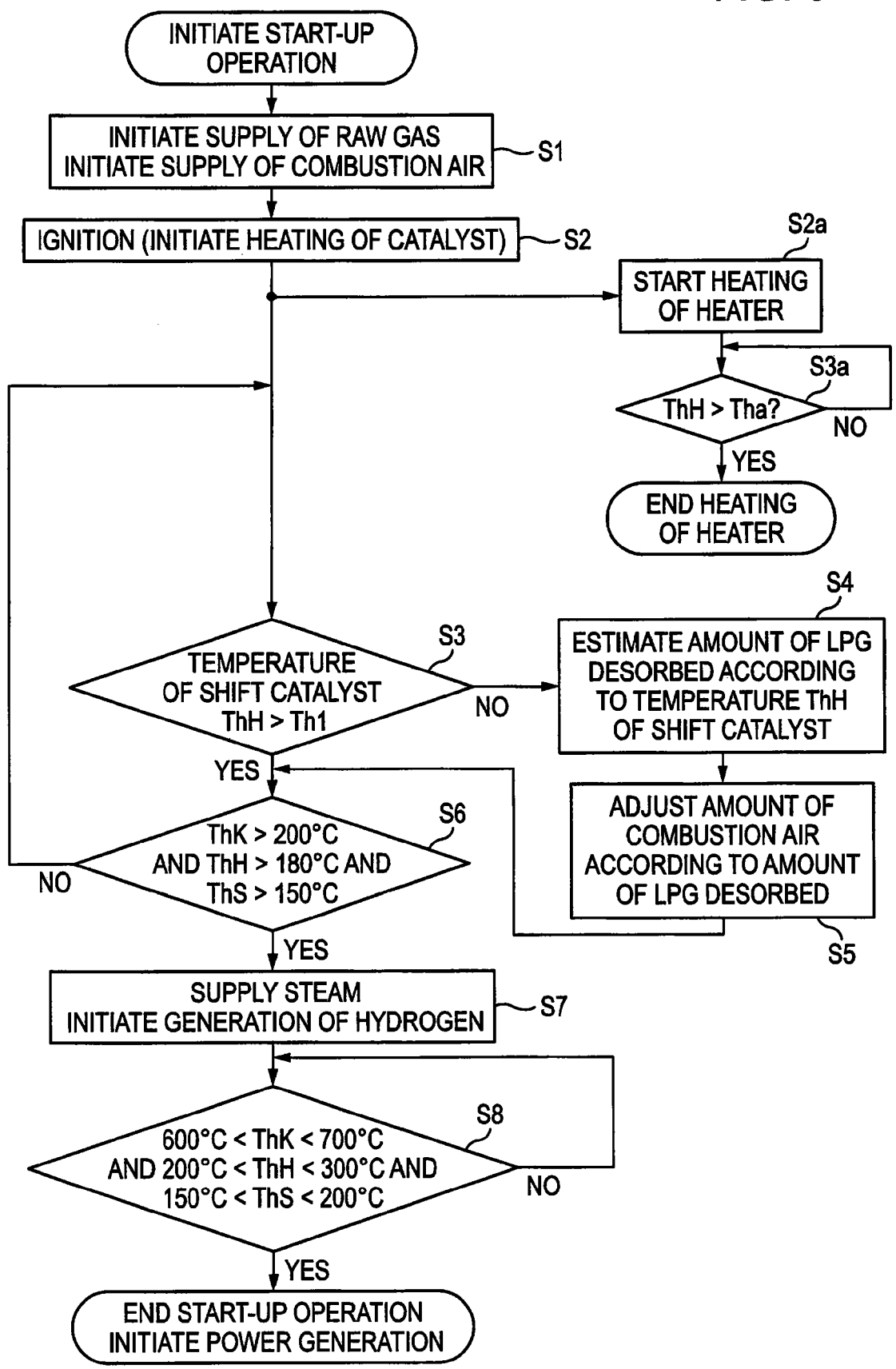
FIG. 8 is a flowchart showing control flow of a main portion at the start-up operation of the fuel cell system of the embodiment.

Start-up operation of the fuel cell system 1 of the second embodiment of the present invention is hereunder described by use of FIG. 8 while making a reference to FIG. 7.

FIG. 8 is a flowchart showing control flow of a main portion at the start-up operation of the fuel cell system 1 of the second embodiment of the present invention. Detailed explanations about those elements that are the same as those described in connection with the first embodiment are sometimes omitted.

As shown in FIG. 8, at start-up operation of the fuel cell system 1, the raw gas supply device 6 first supplies the burner unit 12 with an LPG that is a raw gas, and the combustion air fan 7 supplies the burner unit 12 with combustion air (step S1). In the burner unit 12, an unillustrated igniter ignites the thus-supplied LPG and the combustion air, thereby producing combustion (step S2). A resultant combustion exhaust gas thereby circulates, in sequence, through the combustion exhaust gas channel 13 provided in the shift unit 30 that does not directly contact the shift catalyst 10a and the selective oxidation unit 11 that does not directly contact the selective oxidation catalyst 11a. As a result, the shift catalyst 10a and the selective oxidation catalyst 11a begin to be heated from inside.

Concurrently, electric power is applied to the shift heater 31 and the selective oxidation heater 33 at this time, thereby heating the shift catalyst 10a and the selective oxidation catalyst 11a from outside, as well (step S2a). Heating operation of the shift heater 31 and the selective oxidation heater 33 are continually carried out until the temperature (ThH) of the shift catalyst 10a detected by the shift temperature sensor 10b comes to the predetermined temperature (Tha) (Yes in step S3a). After the temperature (ThH) of the shift catalyst 10a has reached or exceeded the predetermined temperature, application of electric power to the shift heater 31 and the selective oxidation heater 33 is stopped, so that only heating caused by the combustion exhaust gas is left. The predetermined temperature (Tha) will be described later.

Te control unit 5 then compares the temperature (ThH) of the shift catalyst 10a with the predetermined temperature (Th1) (step S3). The amount of the desorbed LPG desorbed from the shift catalyst 10a is estimated according to the temperature (ThH) of the shift catalyst 10a (step S4) until the temperature (ThH) of the shift catalyst 10a detected by the shift temperature sensor 10b exceeds the predetermined temperature (Th1) (No in step S3). Moreover, the amount of the desorbed LPG is combined with the amount of LPG that is a raw gas supplied by the raw gas supply device 6, and the thus-combined LPG is burnt in the burner unit 12 in conjunction with a predetermined amount of combustion air (step S5).

The operation described thus far is analogous to that described in connection with the first embodiment. However, in the second embodiment, the shift catalyst 10a is heated from both sides; namely, an interior wall and an exterior wall of a double-layer cylindrical filled layer. Hence, a temperature distribution of the shift catalyst 10a may differ, at the temperature detected by the shift temperature sensor 10b, from that of the shift catalyst described in connection with the first embodiment. Therefore, the temperature (ThH) detected by the shift temperature sensor 10b and the amount of the desorbed LPG desorbed from the shift catalyst 10a may differ, depending on the location of the shift temperature sensor 10b, from a case where the shift heater 31 is provided to a case where the shift heater 31 is not provided.

The predetermined temperature (Tha) at which the shift heater 31 and the selective oxidation heater 33 continually carry out heating is first a temperature at which the raw gas will not condense even when supplied to the shift catalyst 10a and the selective oxidation catalyst 11a while mixed with steam at a temperature of 100° C. or more and a temperature before steam is supplied to the fuel processor 3 while mixed with an LPG. Specifically, the fuel cell system 1 of the second embodiment performs control operation so as to shut off application of power to the shift heater 31 and the selective oxidation heater when the shift temperature sensor 10b has detected a temperature of about 180° C. In the fuel cell system 1 of the second embodiment, the temperature of the selective oxidation catalyst is also about 150° C.

As described above, in the fuel cell system 1 of the second embodiment, an amount of the desorbed raw gas desorbed as a result of an increase in temperature of the shift catalyst 10a at the start-up operation is estimated from the temperature of the shift catalyst 10a detected by the shift temperature sensor 10b. According to a total amount of the estimated desorbed gas and the supplied raw gas, the combustion air is supplied to the burner unit 12 such that a predetermined air-fuel ratio is achieved, thereby producing combustion. As a consequence, it is possible to produce stable combustion while preventing occurrence of incomplete combustion and perform start-up operation of the fuel cell system 1 without failure. Moreover, heating the shift catalyst 10a and the selective oxidation catalyst 11a to a predetermined temperature within a short period of time makes it possible to shorten a rise time of the fuel cell system 1 consumed by start-up operation.

The fuel cell system 1 of the second embodiment has been described by reference to the example in which start-up operation of the fuel cell system 1 is performed by use of the shift heater 31 and the selective oxidation heater 33. However, start-up operation of the fuel cell system is not limited to use of the two heaters. For example, only a shift heater may also be provided without use of the selective oxidation heater 33. In this case, the raw gas circulating through the layer filled with the shift catalyst 10a is heated by heating of the shift catalyst 10a performed by the shift heater 31 as well as by heating of the shift catalyst 10a performed by the combustion exhaust gas. The thus-heated raw gas is supplied to the layer filled with the selective oxidation catalyst 11a. Hence, when compared with the case where the shift heater 31 is not provided, the selective oxidation heater 11a can be heated within a shorter period of time. As a consequence, it is effective for establishing, at low cost, the fuel cell system 1 for which there exists a desire for a shorter rise time at start-up operation.

The fuel cell system 1 of the second embodiment is described by reference to the example in which the electric heaters are used for the shift heater 31 and the selective oxidation heater 33. However, the heaters are not limited to the electric heater. For example, a heating burner unit having a configuration analogous to that of the burner unit 12 may also be provided. It thereby becomes possible to obviate power consumption of the heater and realize the fuel cell system 1 exhibiting superior system efficiency in a simple configuration. Further, the burner unit can be caused to act also as a heating burner unit. The configuration of the fuel cell system can thereby be simplified further. The heating burner unit can also be configured, at this time, so as to additionally heat the reforming unit 9.

Another method for starting the fuel cell system 1 of the second embodiment of the present invention is hereunder described by reference to FIG. 9.

Figure 9:
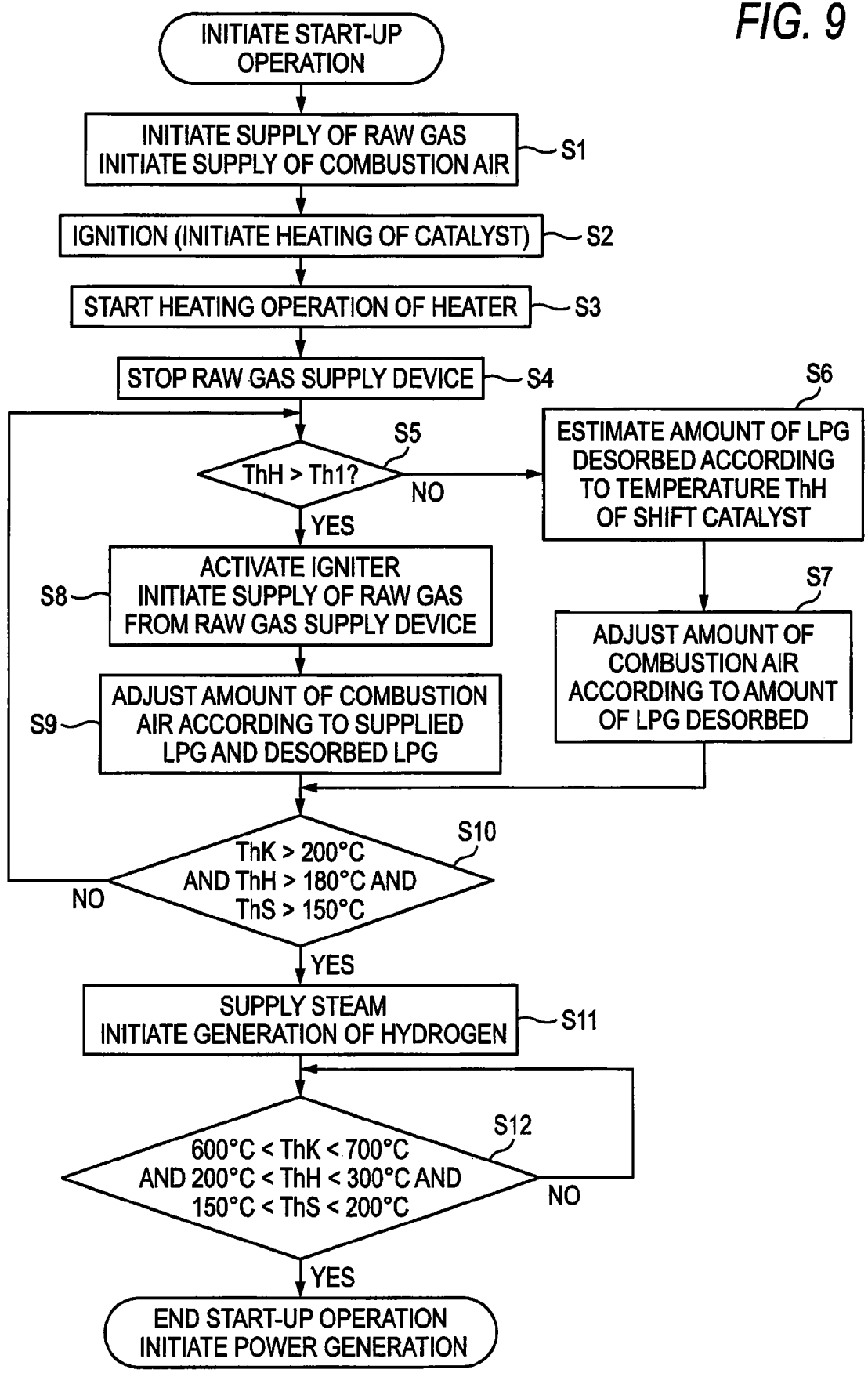
FIG. 9 is a flowchart for explaining control flow of a main portion in another method relating to the start-up operation of the fuel cell system of the embodiment.

FIG. 9 is a flowchart for describing control flow of a main portion in another method for starting the fuel cell system 1 of the second embodiment of the present invention.

As shown in FIG. 9, the fuel cell bypass valve 16 is first opened at start-up operation of the fuel cell system 1, and the raw gas supply device 6 and the combustion air fan 7 are activated, thereby supplying the burner unit 12 with the LPG, which is a raw gas, and the combustion air (step S1). Ignition is performed by use of the unillustrated igniter, thereby commencing combustion of the LPG (step S2).

Subsequently, after an increase in temperature of the shift catalyst 10a has been ascertained by use of the shift temperature sensor 10b, application of electric power to the shift heater 31 and the selective oxidation heater 33 is initiated, and the heaters start heating the respective catalysts (step S3). The raw gas supply provided by the raw gas supply device 6 is stopped at this time, and there is burnt only the desorbed raw gas that becomes desorbed from the shift catalyst 10a with an increase in temperature of the shift catalyst 10a (step S4).

Next, the temperature (ThH) of the shift catalyst 10a and the predetermined temperature (Th1) are now compared to each other (step S5). The amount of the desorbed raw gas desorbed from the shift catalyst 10a is first estimated from the temperature of the shift catalyst 10a detected by the shift temperature sensor 10b (step S6) until the temperature (ThH) of the shift catalyst 10a exceeds the predetermined temperature (Th1) (No in step S5). The amount of air sent by the combustion air fan 7 is then adjusted (step S7). The fuel cell system is started along the control flow following step S10 in the same manner as in the other embodiment.

When the temperature (ThH) of the shift catalyst 10a exceeds the predetermined temperature (Th1) (Yes in step S5), after elapse of a predetermined period of time the raw gas supply device 6 resumes supplying of the LPG, which is the raw gas, while the unillustrated igniter is held operational (step S8).

Next, the amount of combustion air supplied to the burner unit 12 by the combustion air fan 7 is adjusted so as to become commensurate with the total amount of the LPG supplied by the raw gas supply device 6 and the desorbed LPG (step S9).

The fuel cell system 1 performs start-up operation along the control flow following step S10 as in the other embodiment.

Combustion stemming solely from the desorbed LPG desorbed from the shift catalyst 10a has been described in the above by reference to the example in which the combustion is continually carried out until the temperature (ThH) of the shift catalyst 10a comes to the predetermined temperature (Th1). However, there may also be employed another method for keeping combustion for a given period of time before the predetermined temperature (Th1) is achieved. The predetermined temperature (Th1) designates a temperature of the shift catalyst 10a at which, when a sufficient amount of LPG is adsorbed by the shift catalyst 10a, the amount of the desorbed LPG desorbed from the shift catalyst 10a becomes sufficiently smaller than the amount of LPG that is a raw gas supplied by the raw gas supply device 6 to such an extent that the amount of the desorbed LPG does not much affect the air-fuel ratio. Further, the predetermined time designates a time elapsed before the amount of the desorbed LPG becomes sufficiently smaller.

According to the second embodiment, the desorbed raw gas desorbed from the raw gas adsorbed to the shift catalyst 10a is burnt by priority. When compared with the case where the desorbed raw gas is simultaneously burnt in conjunction with the raw gas supplied from the raw gas supply device, an increase in the temperature of the reforming catalyst 9a can be made gentle even if the amount of raw gas supplied by the raw gas supply device is increased. It is thereby possible to prevent variations in a distribution of temperature of the layer filled with the reforming catalyst 9a, which would otherwise arise when the temperature increase of the reforming catalyst 9a is sharp, and fracture of the reforming catalyst 9a, which would otherwise be caused by stress attributable to a sharp temperature change. As a consequence, stable start-up operation and the fuel cell system 1 that operates reliably over a long period of time can be implemented.

Specifically, when the desorbed raw gas desorbed from the catalyst at the start-up operation and the raw gas supplied by the raw gas supply device are mixed and burnt in the burner unit 12, the amount of raw gas supplied from the raw gas supply device must be made sufficiently smaller. In the meantime, during power generation, an amount of raw gas which will turn into a material of a reformed gas required for power generation must be supplied while the temperature of the reforming unit 9, which performs steam reforming that is an endoergic reaction, is maintained at about 700° C. by means of combustion of hydrogen in the off-gas. To this end, a raw gas supply device capable of supplying a raw gas by controlling an amount of flow over a wide range becomes necessary, which in turn leads to an increase in the size and complexity of the heat generation system.

According to the second embodiment, it is possible to control an increase in temperature of the shift catalyst 10a by means of on/off control of the shift heater 31 and control of the heater output. Further, the flow amount of the desorbed raw gas desorbed from the shift catalyst 10a can also be adjusted. As a consequence, a fuel cell system capable of controlling an increase rate of temperature of the reforming catalyst 9a can be embodied by means of a comparatively simple configuration.

The second embodiment has been described by reference to the example including initially supplying the LPG, which is the raw gas, to the burner unit 12 from the raw gas supply device, igniting the LPG by means of the igniter, starting heating operation of the heater and subsequently stopping the supply of the LPG from the raw gas supply device, and commencing combustion of only the desorbed LPG desorbed from the shift catalyst 10a. However, the second embodiment is not limited to the sequence of operations. For example, heating of the shift catalyst 10a may first be started by means of the heater, and the desorbed LPG resultantly desorbed from the catalyst then may be ignited. Even in this case, an analogous operation and working-effect are yielded.

Although the fuel cell system 1 of the second embodiment has been described by means of taking electric heaters as examples of the shift heater 31 and the selective oxidation heater 33. However, the heaters are not limited to the electric heaters. For example, there may also be provided a heating burner unit that has a configuration analogous to that of the burner unit 12 and that is to be used for heating a catalyst at the start-up operation.

An example configuration of the fuel cell system having a heating burner unit is hereunder described by reference to the drawings.

Figure 10:
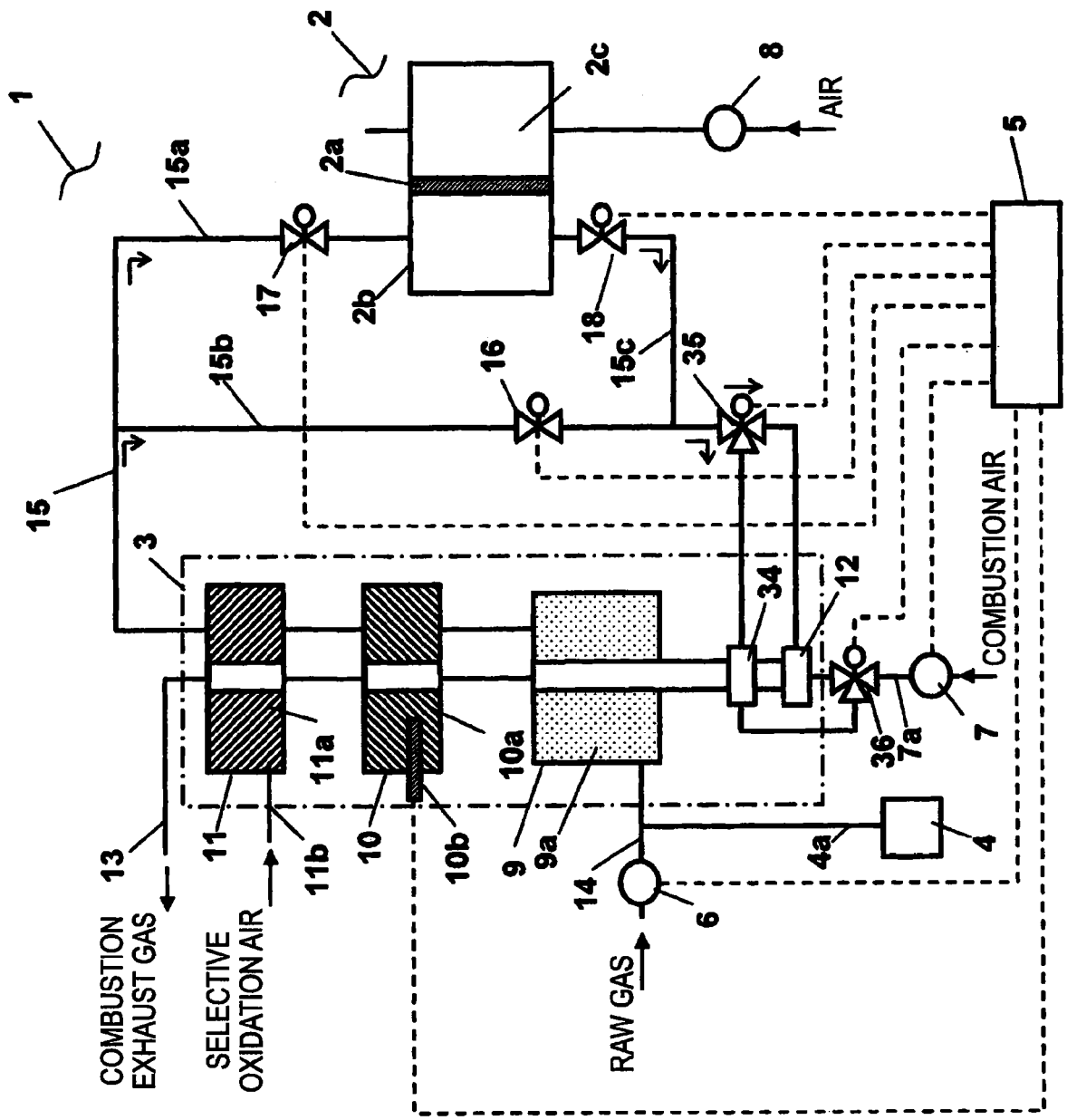
FIG. 10 is a schematic diagram illustrating another example fuel cell system of the embodiment of the present invention.

FIG. 10 is a schematic diagram illustrating another example of the fuel cell system of the second embodiment of the present invention.

As shown in FIG. 10, the fuel cell system 1 of the present embodiment additionally has the burner unit 12, the heating burner unit 34, a previous-stage burner unit directional control valve 35, and a combustion air channel changeover valve 36. According to a signal from the control unit 5, the previous-stage burner unit directional control valve 35 switches the raw gas from the raw gas channel 15 between the burner unit 12 and the heating burner unit 34 and subsequently supplies the gas to the thus-selected burner unit. According to the signal from the control unit 5, the combustion air channel changeover valve 36 switches the combustion air between the burner unit 12 and the heating burner unit 34 and then supplies the air to the selected burner unit. The heating burner unit 34 heats the reforming catalyst 9a, the shift catalyst 10a, and the selective oxidation catalyst 11a by means of combustion heat and the combustion exhaust gas in the same manner as does the burner unit 12.

The heating burner unit 34 can be made smaller than the burner unit 12 at this time and is capable of burning even a small amount of raw gas and also enhancing control of rates of temperature increase of the respective catalysts. Therefore, the heating burner unit 34 is used at start-up operation of the fuel cell system, whereby an amount of heat given to the catalysts can be controlled with comparatively superior accuracy.

As described in the above, according the present embodiment, the heating burner unit 34 is additionally provided to thus control the rate of temperature increase in the catalysts with comparatively superior accuracy, so that the amount of the desorbed raw gas can be controlled with superior accuracy. A fuel cell system that can hold the air-fuel ratio of the burner unit 12 in a predetermined range and perform stable start-up operation can consequently be embodied.

Third Embodiment

Figure 11:
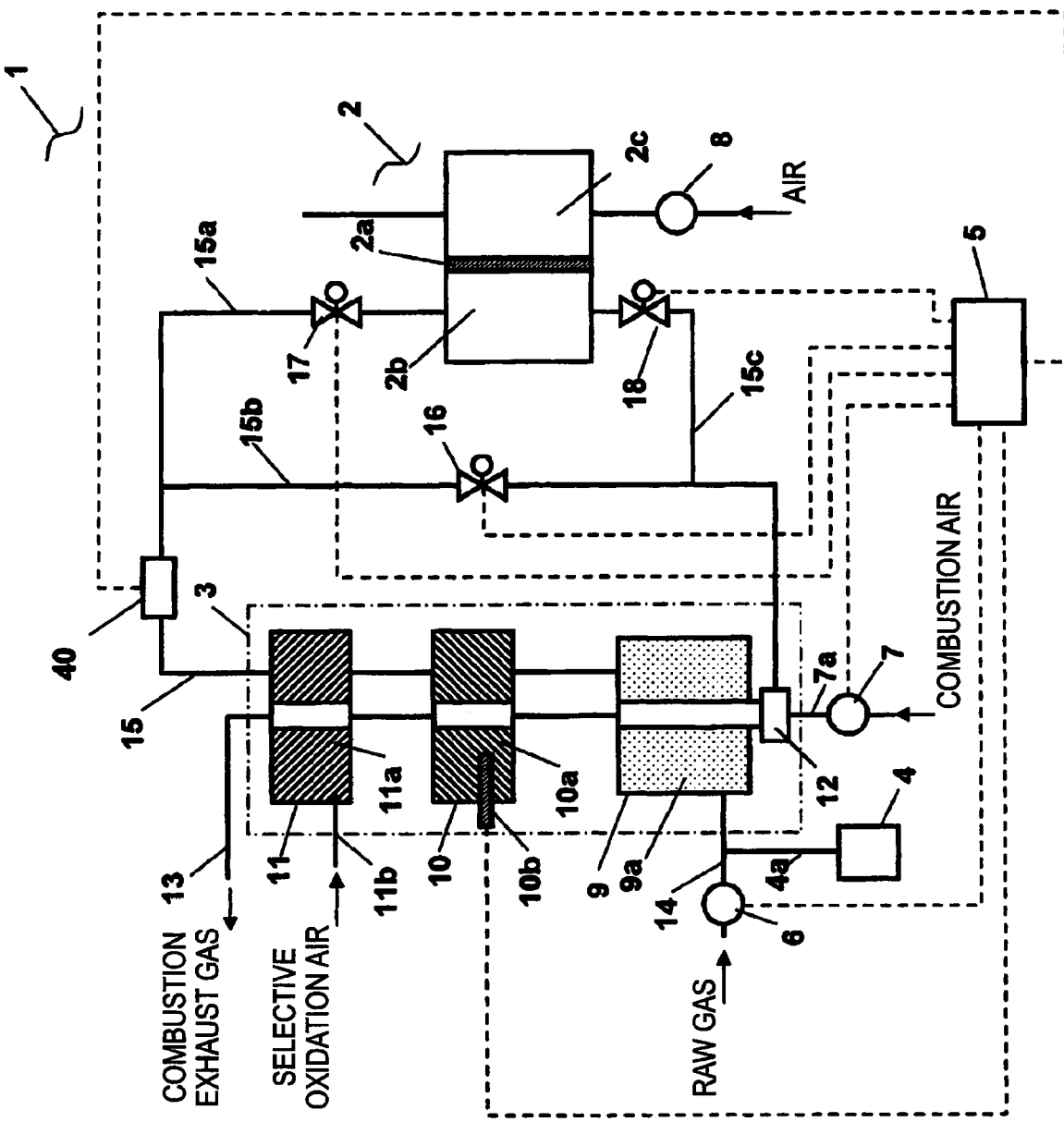
FIG. 11 is a schematic diagram showing a configuration of a fuel cell system according to a third embodiment of the present invention.

FIG. 11 is a schematic diagram showing a configuration of the fuel cell system 1 of a third embodiment of the present invention. In FIG. 11, constituent elements that are the same as those of the fuel cell systems 1 described in connection with the first and second embodiments are assigned the same reference numerals, and their explanations are omitted.

As shown in FIG. 11, the fuel cell system 1 of the third embodiment differs from the fuel cell system described in connection with the first embodiment in that a flow meter 40 through which the raw gas channel 15 runs is disposed in the raw gas channel 15 of the fuel cell system 1 described in connection with the first embodiment.

At the start-up operation of the fuel cell system 1, the flow meter 40 measures the total amount of raw gas supplied from the raw gas supply device 6 and the desorbed raw gas desorbed from the catalyst of the fuel processor 3. The word "combustion gas supplied to the burner unit 12" at the start-up operation of the fuel cell system 1 designates a raw gas supplied from the raw gas supply device 6 and the desorbed raw gas desorbed from the catalyst of the fuel processor 3. The flow meter 40 is wired in such a way that the flow amount of combustion gas measured by the flow meter 40 is input as a signal to the control unit 5.

Figure 12:
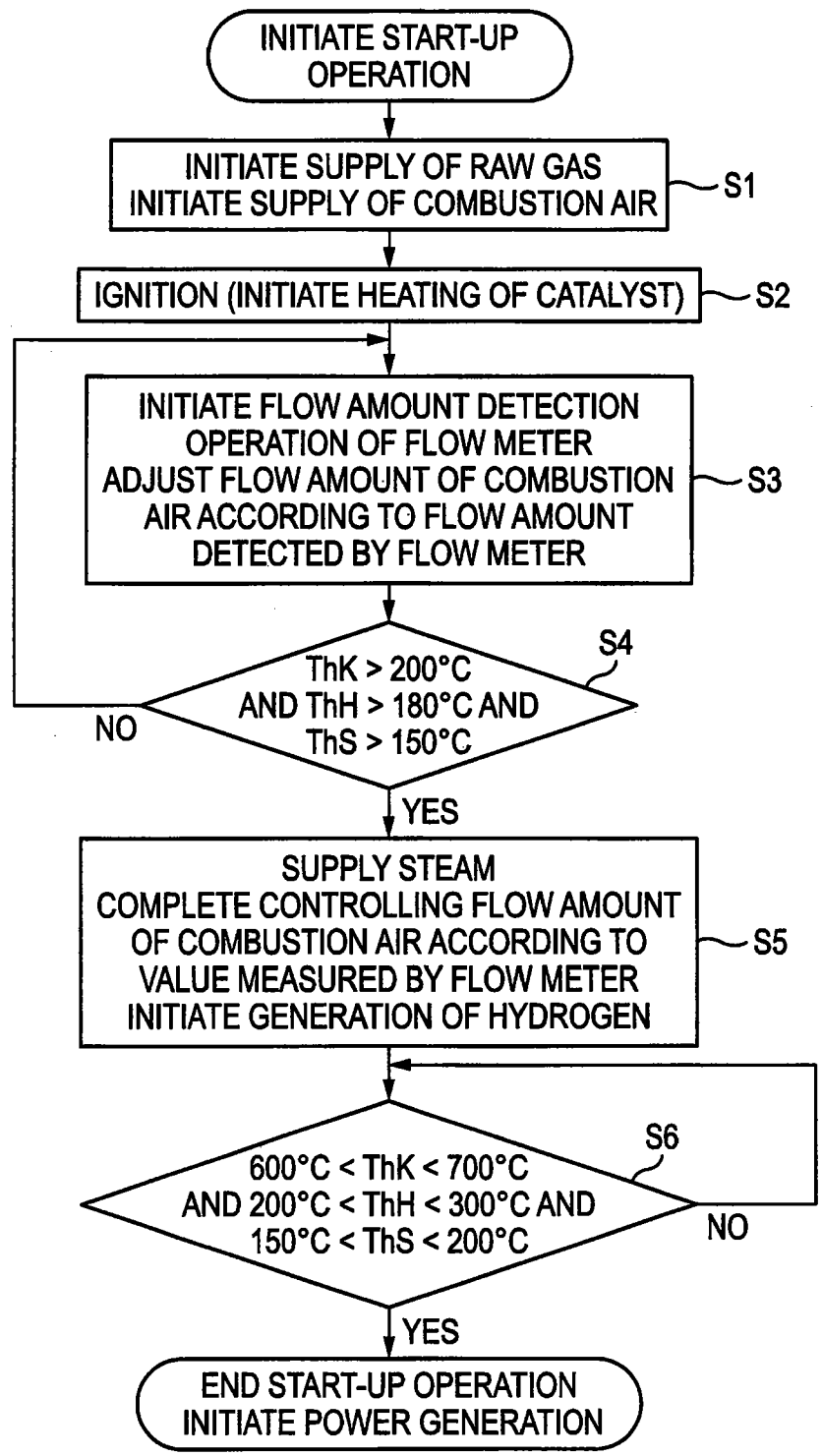
FIG. 12 is a flowchart showing control flow of a main portion at the start-up operation of the fuel cell system of the embodiment.

Operation performed at the start-up operation of the fuel cell system 1 of the third embodiment is hereunder described by use of FIG. 12 while a reference is made to FIG. 11.

FIG. 12 is a flowchart showing control flow of a main portion at the start-up operation of the fuel cell system 1 of the third embodiment. Detailed descriptions about portions of the present embodiment analogous to their counterparts of the other embodiments will be omitted in some cases.

As shown in FIG. 12, at the start-up operation of the fuel cell system 1, the raw gas supply device 6 supplies a predetermined flow amount of an LPG, which is the raw gas, to the burner unit 12; and the combustion air fan 7 supplies a predetermined flow amount of combustion air to the burner unit 12, as well (step S1). The LPG, which is the raw gas, is first supplied to the reforming unit 9 by way of the raw gas supply channel 14. The LPG sequentially circulates through the shift unit 10 and the selective oxidation unit 11 and is thus supplied to the burner unit 12 by way of the fuel cell bypass channel 15b of the raw gas channel 15. Only the LPG, which is the raw gas supplied from the raw gas supply device 6, is supplied as a combustion gas to the burner unit 12 at this point in time.

The thus-supplied LPG and the combustion air are ignited by means of the unillustrated igniter in the burner unit 12, whereupon combustion is initiated (step S2). When the burner unit 12 starts burning the LPG, the reforming catalyst 9a of the reforming unit 9 begins to be heated by combustion heat, whereupon the temperature (ThK) of the reforming catalyst 9a starts increasing. Concurrently, the combustion exhaust gas flows through the combustion exhaust gas channel 13 laid in the shift unit 10 and the selective oxidation unit 11, whereby the shift catalyst 10a and the selective oxidation catalyst 11a begin to be heated. The temperature (ThH) of the shift catalyst 10a and the temperature (ThS) of the selective oxidation catalyst 11a start increasing.

When the temperature of the shift catalyst 10a starts increasing, the LPG adsorbed to the shift catalyst 10a begin to desorb, and the thus-desorbed LPG is supplied as a desorbed LPG to the burner unit 12. Therefore, the burner unit 12 is supplied with the LPG, as the combustion gas, the LPG which is the raw gas supplied from the raw gas supply device 6 and the desorbed LPG. The flow meter 40 starts detecting a flow amount of combustion gas at this time, and the control unit 5 starts regulating the flow amount of combustion air according to the flow amount of combustion gas detected by the flow meter 40 (step S3).

The temperature (ThK) of the reforming catalyst 9a, the temperature (ThH) of the shift catalyst 10a, and the temperature (ThS) of the selective oxidation catalyst 11a are compared with their respective predetermined temperatures (step S4). When any of the temperature (ThK) of the reforming catalyst 9a, the temperature (ThH) of the shift catalyst 10a, and the temperature (ThS) of the selective oxidation catalyst 11a is lower than its predetermined temperature (No in step S4), regulating the flow amount of combustion air according to the flow amount of combustion gas detected by the flow meter 40 is continually performed. In the fuel cell system 1 of the third embodiment, the respective predetermined temperatures are set as follows in the same manner in the fuel cell system 1 of the third embodiment; namely, the temperature (ThK) of the reforming catalyst 9a is set to 200° C.; the temperature (ThH) of the shift catalyst 10a is set to 180° C., and the temperature (ThS) of the selective oxidation catalyst 11a is set to 150° C.

When all of the temperatures; namely, the temperature (ThK) of the reforming catalyst 9a, the temperature (ThH) of the shift catalyst 10a, and the temperature (ThS) of the selective oxidation catalyst 11a, come to predetermined temperatures or more (Yes in step S4), supplying steam to the raw gas supply channel 14 from the steam generating device 4 by way of the steam channel 4a is initiated, and controlling the flow amount of combustion air according to the value measured by the flow meter 40 is completed. A mixed gas including the LPG and the steam is supplied to the layer filled with the reforming catalyst 9a of the reforming unit 9, whereupon reforming the LPG into hydrogen is initiated (step S5).

The reason why starting a steam supply and completing control of the flow amount of combustion air according to the value measured by the flow meter 40 is that a composition of the combustion gas circulating through the flow meter 40 has changed from the hereto circulating LPG to a reformed gas including hydrogen. In addition, the reformed gas includes steam. Hence, the flow meter 40 cannot accurately measure the flow amount of combustion gas.

However, when all of the temperatures; namely, the temperature (ThK) of the reforming catalyst 9a, the temperature (ThH) of the shift catalyst 10a, and the temperature (ThS) of the selective oxidation catalyst 11a, come to predetermined temperatures or more, the desorbed raw gas desorbed from the catalyst (the desorbed LPG of the present embodiment) become substantially extinct as shown in FIG. 3, so that the desorbed raw gas comes to stop affecting combustion of the burner unit 12. The flow amount of combustion air is adjusted according to the flow amount of the LPG which is the raw gas supplied from the raw gas supply device 6.

It is now determined whether or not the temperature of the respective catalysts fall within ranges of their respective predetermined temperatures. Namely, a determination is made whether or not the temperature of the reforming catalyst falls within a range from about 600 to 700° C.; whether or not the temperature of the shift catalyst falls within a range from about 200 to 300° C.; and whether or not the temperature of the selective oxidation catalyst falls within a range from about 150 to 200° C. (step S6). When the temperatures of the respective catalysts are lower than their respective temperature ranges (No in step S6), reactions of the respective catalysts are insufficient, and the amount of hydrogen in the reformed gas is small. Further, the amount of carbon monoxide is large. Therefore, the reformed gas in the course of temperature rise is caused to circulate through the fuel cell bypass channel 15b. When the temperature of the respective catalysts have risen to the predetermined temperature ranges (Yes in step S6), the fuel cell bypass valve 16 is closed after the component of the reformed gas has become stable. Concurrently, the fuel cell entrance valve 17 and the fuel cell exit valve 18 are opened, and the reformed gas is supplied to the anode electrode 2b of the fuel cell 2, and power generation is thereupon started. Further, when the temperatures of the respective catalysts are outside their respective temperature ranges (No in step S6), control analogous to that performed in the related art is conducted, and the system waits until the catalysts fall in their respective temperature ranges.

As described above, according to the fuel cell system 1 of the third embodiment, the flow meter 40 measures the total flow amount of the desorbed raw gas desorbed from the shift catalyst 10a with an increase in its temperature at the start-up operation and the the raw gas supplied from the raw gas supply device. The flow amount of combustion air can be adjusted according to the value measured by the flow meter 40. Therefore, combustion performed by the burner unit 12 can be made stable. As a consequence, stable combustion is realized while occurrence of incomplete combustion is prevented, and start-up operation of the fuel cell system 1 can be performed reliably.

In the fuel cell system 1 of the third embodiment, the flow meter 40 is placed in the raw gas channel. However, the flow meter may also be disposed in a fuel cell bypass channel or an off-gas channel.

In the fuel cell system 1 of the third embodiment, the raw gas supplied from the raw gas supply device is supplied to the burner unit 12 by way of the fuel processor 3 at the start-up operation of the fuel cell system 1. The fuel cell system can also be embodied as another fuel cell system. Specifically, the system is provided with a branch channel that is separately branched from the raw gas supply channel and that supplies the raw gas directly to the burner unit 12 and channel changeover means that switches between supplying the raw gas, which is supplied from the raw gas supply device, to the fuel processor 3 and supplying the raw gas directly to the burner unit 12 by way of the branch channel. The fuel cell system supplies, at an initial phase of its start-up operation, the raw gas, which is supplied from the raw gas supply device, directly to the burner unit by way of the branch channel before the temperatures of the respective catalysts of the fuel processor 3 reach predetermined temperatures at which a concentration of carbon monoxide is sufficiently decreased and that are suitable for generating a good-quality reformed gas sufficiently including hydrogen. In this case, the flow meter comes to measure the flow amount of the desorbed raw gas desorbed from the respective catalysts of the fuel processor 3. The control unit 5 controls the combustion air fan in such a way that the burner unit is supplied with a flow amount of combustion air commensurate with the total amount of the desorbed raw gas measured by the flow meter 40 and the raw gas supplied from the raw gas supply device. A similar advantage as that yielded in the third embodiment can thereby be yielded.

In the fuel cell system 1 of the third embodiment, the total amount of the raw gas supplied from the raw gas supply device and the desorbed raw gas desorbed from the respective catalysts of the fuel processor 3 is measured by use of the flow meter 40. However, the total amount can also be measured by use of a pressure gauge. Specifically, an advantage analogous to that yielded in the third embodiment can also be yielded by the followings. Namely, the pressure gauge is in advance connected, for example, to the raw gas channel, and the relationship between the flow amount of a gas flowing through the raw gas channel and pressure is stored in the control unit 5 in advance. At the start-up operation of the fuel cell system 1, the flow amount of raw gas supplied to the burner unit 12 (i.e., a total amount of the raw gas supplied from the raw gas supply device and the desorbed raw gas desorbed from the respective catalysts of the fuel processor 3) is estimated from the value measured by the pressure gauge. The control unit controls the flow amount of combustion air supplied from the combustion air fan according to the estimated value.

In the third embodiment, the explanations have been provided by using the LPG as the raw gas. However, the raw gas is not limited to the LPG as in the other embodiments. Another hydrocarbon-based material, such as a town gas and kerosene, can also be used. When a liquid hydrocarbon-based material, such as kerosene, is used, it is better to vaporize the material in the form of a gas. Further, when the type of a material gas has changed, behaviors of the amount of the raw gas adsorbed to the respective catalysts of the fuel processor 3, the temperatures of the respective catalysts, and the flow amount of the desorbed raw gas are expected to change. In the fuel cell system 1 of the third embodiment, the flow amount of raw gas containing the desorbed raw gas supplied to the burner unit 12 is measured, and the flow amount of combustion air is adjusted according to the measured value. Hence, combustion performed by the burner unit 12 can be made stable. However, in relation to the flow meter 40, it is necessary to use the flow meter 40 capable of measuring the flow amount of raw gas according to the type of the raw gas.

In the fuel cell system 1 of the third embodiment, timing when to stop the controlling the flow amount of combustion air according to the flow amount of raw gas detected by the flow meter 40 is made identical with timing when to supply steam as a result of temperatures of the respective catalysts of the fuel processor 3 having reached their respective predetermined temperatures or more. The timing is not limited to that mentioned, so long as the temperatures of the respective catalysts increase, to thus exceed temperatures at which the desorbed raw gas would not affect combustion performed by the burner unit 12.

Fourth Embodiment

Figure 13:
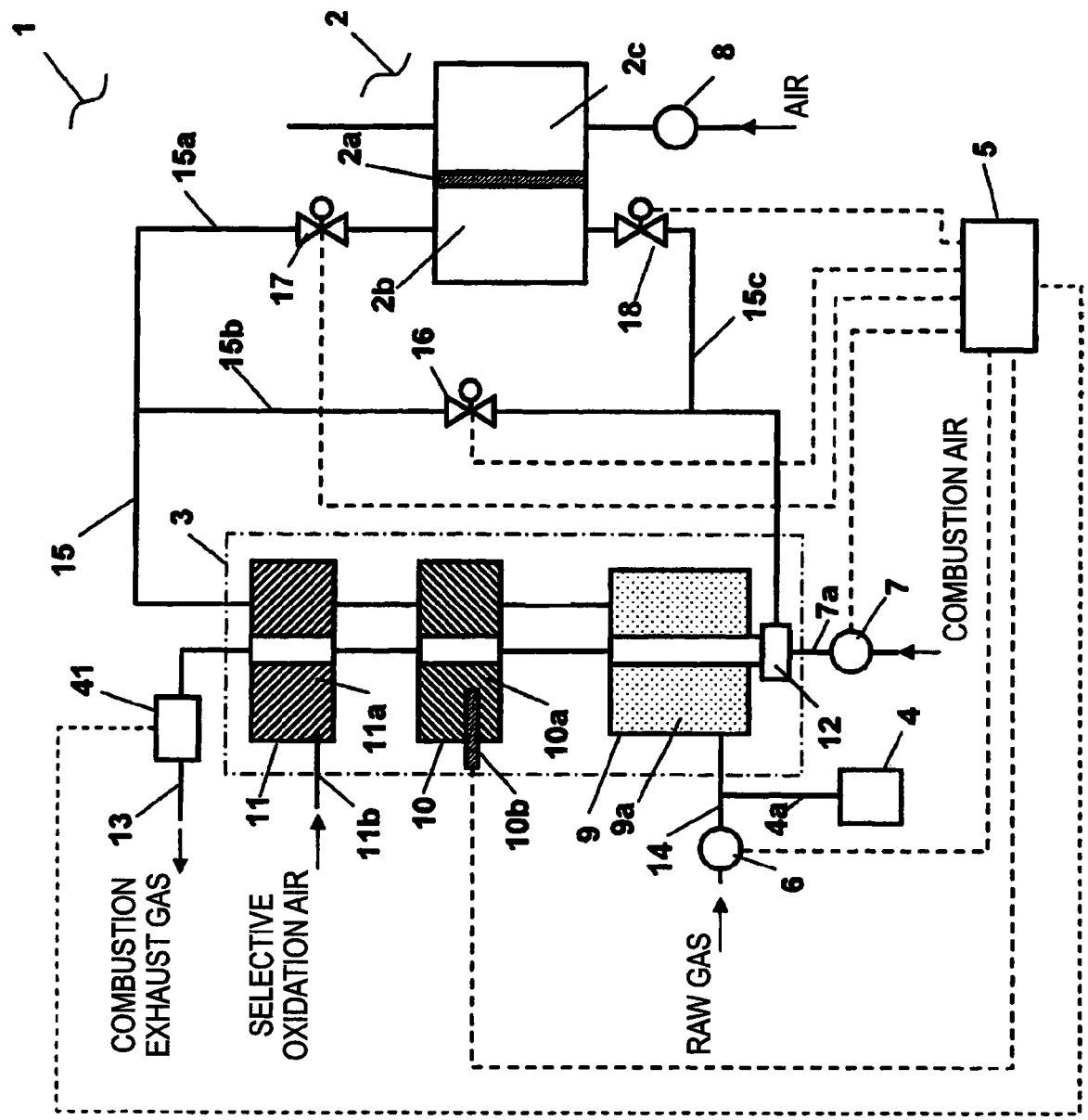
FIG. 13 is a schematic diagram showing a configuration of a fuel cell system of a fourth embodiment of the present invention.

FIG. 13 is a schematic diagram showing a configuration of the fuel cell system 1 of a fourth embodiment of the present invention. In FIG. 13, constituent elements that are the same as their counterparts of the fuel cell systems 1 described in connection with the first through third embodiments are assigned the same reference numerals, and their explanations are omitted.

As shown in FIG. 13, the fuel cell system 1 of the fourth embodiment differs from its counterpart described in connection with the first embodiment in that an oximeter 41 that is equivalent to exhaust gas analyzing means for measuring the concentration of oxygen in a combustion exhaust gas is placed in the combustion exhaust gas channel 13 of the fuel cell system 1 described in connection with the first embodiment.

The oximeter 41 is for measuring a concentration of oxygen in a combustion exhaust gas produced after the raw gas, the off-gas, and the reformed gas has been burnt in the burner unit 12 along with combustion air. The oximeter 41 is electrically connected in such a way that a measured value is input as a signal to the control unit 5.

Operation performed at the start-up operation of the fuel cell system 1 of the fourth embodiment is hereunder described by reference to FIG. 14 while a reference is made to FIG. 13.

Figure 14:
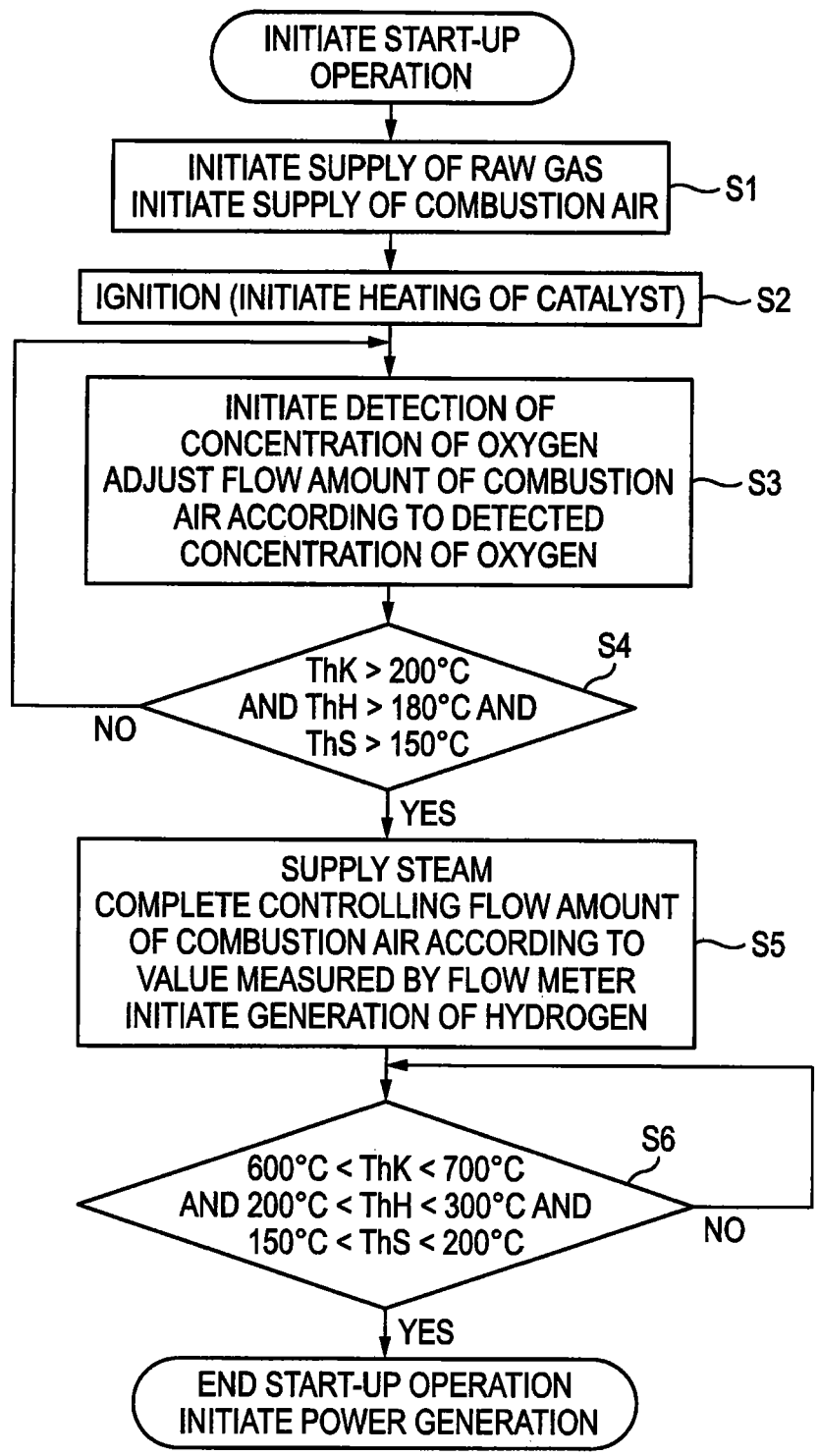
FIG. 14 is a flowchart showing control flow of a main portion at the start-up operation of the fuel cell system of the embodiment.

FIG. 14 is a flowchart showing control flow of a main portion at the start-up operation of the fuel cell system 1 of the fourth embodiment. Detailed explanations of portions of the system that are identical with their counterparts described in connection with the other embodiments of the present invention are omitted in some cases.

As shown in FIG. 14, at the start-up operation of the fuel cell system 1, the raw gas supply device 6 first supplies a predetermined flow amount of an LPG, which is the raw gas, to the burner unit 12; and the combustion air fan 7 supplies a predetermined flow amount of combustion air to the burner unit 12, as well (step S1). The LPG which is the raw gas is first supplied to the reforming unit 9 by way of the raw gas supply channel 14. The LPG sequentially circulates through the shift unit 10 and the selective oxidation unit 11 and is supplied to the burner unit 12 by way of the fuel cell bypass channel 15b of the raw gas channel 15. Only the LPG which is the raw gas supplied from the raw gas supply device 6 is supplied as a combustion gas to the burner unit 12 at this point in time.

In the burner unit 12, the unillustrated igniter starts igniting the supplied LPG and the combustion air, to thus start combustion (step S2). When the burner unit 12 starts combustion of the LPG, the reforming catalyst 9a of the reforming unit 9 begins to be heated by combustion heat, whereupon the temperature (Thk) of the reforming catalyst 9a begins to increase. Concurrently, the combustion exhaust gas runs through the combustion exhaust gas channel 13 formed in the shift unit 10 and the selective oxidation unit 11, whereby the shift catalyst 10a and the selective oxidation catalyst 11a begin to be heated. The temperate (ThH) of the shift catalyst 10a and the temperature (ThS) of the selective oxidation catalyst 11a begin to increase.

Next, the oximeter 41 starts measuring a concentration of oxygen in the combustion exhaust gas emitted from the burner unit 12 and inputting a measurement value to the control unit 5. According to the concentration of oxygen measured by the oximeter 41, the control unit 5 controls the combustion fan in such a way that the concentration of oxygen measured by the oximeter 41 comes to a predetermined concentration of oxygen, thereby regulating the flow amount of combustion air (step S3). Specifically, when the concentration of oxygen in the combustion exhaust gas measured by the oximeter 41 is lower than the predetermined concentration of oxygen, the flow amount of combustion air supplied by the combustion air fan 7 is increased. Conversely, when the concentration of oxygen in the combustion exhaust gas is higher than the predetermined concentration of oxygen, the flow amount of combustion air supplied by the combustion air fan 7 is decreased.

When the temperatures of the respective catalysts of the fuel processor 3 begin to increase and when the raw gas adsorbed to the catalysts begin to desorb, a total amount of the raw gas supplied from the raw gas supply device 6 and the desorbed raw gas desorbed from the catalysts comes to be supplied to the burner unit 12. Since the flow amount of combustion air is adjusted according to the concentration of oxygen in the combustion exhaust gas, the amount of combustion air commensurate with the flow amount of supplied raw gas is supplied to the burner unit 12.

Next, the temperature (ThK) of the reforming catalyst 9a, the temperature (ThH) of the shift catalyst 10a, and the temperature (ThS) of the selective oxidation catalyst 11a are compared with their respective predetermined temperatures (step S4). When any of the temperature (ThK) of the reforming catalyst 9a, the temperature (ThH) of the shift catalyst 10a, and the temperature (ThS) of the selective oxidation catalyst 11a are lower than their predetermined temperatures (No in step S4), the flow amount of combustion air is continually adjusted according to the concentration of oxygen in the combustion exhaust gas detected by the oximeter 41. Like the fuel cell systems 1 of the other embodiments, the fuel cell system of the fourth embodiment has the following predetermined temperatures. Namely, the temperature (ThK) of the reforming catalyst 9a is set to 200° C.; the temperature (ThH) of the shift catalyst 10a is set to 180° C.; and the temperature (ThS) of the selective oxidation catalyst 11a is set to 150° C.

When all of the temperature (ThK) of the reforming catalyst 9a, the temperature (ThH) of the shift catalyst 10a, and the temperature (ThS) of the selective oxidation catalyst 11a come to their predetermined temperatures or more (Yes in step S4), the steam generating device 4 starts supplying steam to the raw gas supply channel 14 by way of the steam channel 4a and also completes controlling the flow amount of combustion air according to the value measured by the oximeter 41. The mixed gas including the LPG and steam is supplied to the layer filled with the reforming catalyst 9a of the reforming unit 9, and reforming the LPG to hydrogen is initiated (step S5).

When the temperature (ThH) of the shift catalyst 10a comes to the predetermined temperature (180° C. in this case) or more, the desorbed raw gas desorbed from the catalysts (the desorbed LPG in the embodiment) becomes substantially extinct as shown in FIG. 3 and does not affect combustion performed in the burner unit 12. Hence, the flow amount of combustion air is adjusted according to the flow amount of LPG which is the raw gas supplied by the raw gas supply device 6.

A determination is now made as to whether or not the respective catalysts are at respective predetermined temperatures; namely, whether or not the reforming catalyst falls in a temperature range from about 600 to 700° C.; whether or not the shift catalyst falls within a temperature range from about 200 to 300° C.; and whether or not the selective oxidation catalyst falls within a temperature range from about 150 to 200° C. (step S6). When the temperatures of the respective catalysts are lower than their respective temperature ranges (No in step S6), reactions of the respective catalysts are insufficient. Namely, since the amount of hydrogen in the reformed gas is small and since the amount of carbon monoxide is large, the reformed gas that is still in the course of temperature rise is caused to circulate through the fuel cell bypass channel 15b. When the temperatures of the respective catalysts have increased to the respective predetermined temperature ranges (Yes in step S6), the fuel cell bypass valve 16 is closed after the components of the reformed gas have become stable. Concurrently, the reformed gas is supplied to the anode electrode 2b of the fuel cell 2 by opening the fuel cell entrance valve 17 and the fuel cell exit valve 18, and power generation is initiated. When the temperatures of the respective catalysts are outside the respective temperature ranges (No in step S6), control similar to that performed in the related art is performed, and processing waits until the the temperatures fall in the respective temperature ranges.

As mentioned above, according to the fuel cell system 1 of the fourth embodiment, the flow amount of combustion air is adjusted at the start-up operation according to the concentration of oxygen in the combustion exhaust gas. Therefore, even when the raw gas absorbed to the catalysts comes to desorb as a result of an increase in the temperatures of the catalysts in the fuel processor 3 and when the thus-desorbed raw gas is supplied to the burner unit, combustion performed in the burner unit can be made stable. As a consequent, occurrence of incomplete combustion is prevented, and stable combustion is realized. Thus, start-up operation of the fuel cell system can be performed without fail.

In the fuel cell system of the fourth embodiment, the flow amount of combustion air is adjusted by use of the oximeter that measures the concentration of oxygen in a combustion exhaust gas, in such a way that the concentration of oxygen in the combustion exhaust gas comes to the predetermined concentration of oxygen. However, a carbon dioxide concentration meter for measuring the concentration of carbon dioxide in a combustion exhaust gas can also be used instead. In this case, when the flow amount of raw gas to be burnt by the burner unit is increased by the desorbed raw gas as a result of an increase in the temperatures of the catalysts in the fuel processor 3, the concentration of carbon dioxide in the combustion exhaust gas increases. Therefore, an advantage similar to that yielded by the fuel cell system of the fourth embodiment can be yielded, so long as the amount of combustion air supplied by the combustion fan is correspondingly increased.

The present patent application is based on Japanese Patent Application (Application No. 2009-078441) filed on Mar. 27, 2009, the entire contents of which is incorporated herein by reference.

INDUSTRIAL APPLICABILITY

The fuel cell system of the present invention can perform stable start-up operation as well as stable combustion of the burner unit and, therefore, is useful for a technical field of a fuel cell system that utilizes a hydrocarbon-based material, such as a town gas and an LPG, by subjecting the material to steam reforming.

The invention claimed is:

1. A fuel cell system comprising:
a reforming unit configured to subject a mixed gas containing a raw gas and steam to a reforming reaction by a reforming catalyst, thereby generating a reformed gas containing hydrogen;
a carbon monoxide decreasing unit configured to allow the reformed gas generated by the reforming unit to contact a carbon monoxide decreasing catalyst, thereby decreasing carbon monoxide contained in the reformed gas;
a fuel cell coupled to the carbon monoxide decreasing unit by a raw gas channel and configured to generate electric power by hydrogen contained in the reformed gas passed through the carbon monoxide decreasing unit and;
a burner unit configured to burn at least one of an off-gas containing hydrogen not consumed in the fuel cell, the raw gas and the reformed gas using combustion air supplied by an air blower; and
a raw gas supply device configured to supply the raw gas to the reforming unit and to the burner unit directly or through the reforming unit,
a controller in communication with the raw gas supply device and the air blower,
the controller executes a stored startup control program and controls the raw gas supply device and the air blower to set a ratio between a total amount and an amount of combustion air delivered to the burner unit by the air blower and to adjust the ratio to a predetermined ratio at the start-up operation of the fuel cell system, where the total amount is a sum of an amount of raw gas supplied by the raw gas supply device and burnt in the burner unit and an amount of a desorbed raw gas desorbed out of components of the raw gas adsorbed by at least one of the reforming catalyst and the carbon monoxide decreasing catalyst.

2. The fuel cell system according to claim 1, further comprising a heating unit configured to heat at least one of the reforming catalyst and the carbon monoxide decreasing catalyst at the start-up operation of the fuel cell system.

3. The fuel cell system according to claim 2, comprising one or more temperature sensors in communication with the controller and configured to detect at least one of a temperature of the reforming catalyst and a temperature of the carbon monoxide decreasing catalyst,
wherein the amount of the desorbed raw gas, desorbed out of the components of the raw gas adsorbed from at least one of the reforming catalyst and the carbon monoxide decreasing catalyst and is burned by the burner unit, is estimated by the controller at the start-up operation of the fuel cell system based on at least one of the temperature of the reforming catalyst and the temperature of the carbon monoxide decreasing catalyst detected by the temperature sensor.

4. The fuel cell system according to claim 2, further comprising a timer unit configured to measure a time elapsed since the heating unit starts a heating operation,
wherein the amount of the desorbed raw gas, which is desorbed out of the components of the raw gas which are adsorbed to at least one of the reforming catalyst and the carbon monoxide decreasing catalyst and which is to be burned by the burner unit, is estimated by the controller based on the time measured by the timer unit.

5. The fuel cell system according to claim 2,
wherein the heating unit starts heating at least one of the reforming catalyst and the carbon monoxide decreasing catalyst at the start-up operation of the fuel cell system, and
wherein the controller operates the raw gas supply device after elapse of a predetermined time period since the heating unit started a heating operation.

6. The fuel cell system according to claim 2, comprising one or more temperature sensors configured to detect at least one of a temperature of the reforming catalyst and a temperature of the carbon monoxide decreasing catalyst,
wherein at the start-up operation of the fuel cell system, the controller operates the heating unit to heat at least one of the reforming catalyst and the carbon monoxide decreasing catalyst, and
wherein after the temperature detected by the temperature sensor becomes the predetermined temperature or more, the controller activates the raw gas supply device.

7. The fuel cell system according to claim 2,
wherein the raw gas supply device and the heating unit are activated by the controller at the start-up operation of the fuel cell system,
wherein after the burner unit burns the raw gas supplied from the raw gas supply device for a predetermined time period, the controller stops the operation of the raw gas supply device, and
wherein the controller activates the raw gas supply device after elapse of a predetermined period of time since the heating unit starts a heating operation.

8. The fuel cell system according to claim 2, further comprising one or more temperature sensors configured to detect at least one of a temperature of the reforming catalyst and a temperature of the carbon monoxide decreasing catalyst, wherein at the start-up operation of the fuel cell system, the controller activates the raw gas supply device and the heating unit, wherein after elapse of a predetermined period of time since the heating unit starts heating operation or after the temperature sensor detects a first predetermined temperature or more, the controller stops operation of the raw gas supply device, and wherein after the temperature sensor detects a second predetermined temperature or more, the controller activates the raw gas supply device.

9. The fuel cell system according to claim 2, wherein the heating unit comprises an electric heater.

10. The fuel cell system according to claim 2,
wherein the heating unit comprises a heating burner unit, and
wherein at least one of the reforming unit and the carbon monoxide decreasing unit is heated by a combustion exhaust gas from the heating burner unit.

11. The fuel cell system according to claim 10, wherein the burner unit is used as a heating burner unit.

12. The fuel cell system according to claim 1, further comprising a measurement unit in the raw gas channel configured to measure at least a flow amount of the desorbed raw gas out of the raw gas supplied from the raw gas supply device to the burner unit and the desorbed raw gas, at the start-up operation of the fuel cell system.

13. The fuel cell system according to claim 12,
wherein the measurement unit comprises a flow meter configured to measure at least the flow amount of the desorbed raw gas.

14. The fuel cell system according to claim 12,
wherein the measurement unit comprises a pressure gauge configured to detect at least pressure of the desorbed raw gas.

15. The fuel cell system according to claim 1, further comprising a combustion gas exhaust channel connected to the carbon monoxide decreasing unit and an exhaust gas analysis unit in the combustion gas exhaust channel and configured to detect a concentration of at least one component out of combustion exhaust gas components generated after combustion by the burner unit,
wherein the controller adjusts the amount of combustion air according to the concentration detected by the exhaust gas analysis unit.

16. A method of operating a fuel cell system, the method comprising:
providing a fuel cell system comprising:
a reforming unit configured to subject a mixed gas containing a raw gas and steam to a reforming reaction by a reforming catalyst, thereby generating a reformed gas containing hydrogen;
a carbon monoxide decreasing unit configured to allow the reformed gas generated by the reforming unit to contact a carbon monoxide decreasing catalyst, thereby decreasing carbon monoxide contained in the reformed gas;
a fuel cell configured to generate electric power by hydrogen contained in the reformed gas passed through the carbon monoxide decreasing unit;
a burner unit configured to burn at least one of an off-gas containing hydrogen not consumed in the fuel cell, the raw gas and the reformed gas using combustion air supplied by an air blower;
a raw gas supply device configured to supply the raw gas to the reforming unit and to the burner unit directly or through the reforming unit; and
a heating unit configured to heat at least one of the reforming catalyst and the carbon monoxide decreasing catalyst at the start-up operation of the fuel cell system; and
adjusting a ratio between a total amount and an amount of combustion air delivered to the burner unit by the air blower to a predetermined ratio at a start-up operation of the fuel cell system, where the total amount is a sum of an amount of raw gas supplied by the raw gas supply device and burnt in the burner unit and an amount of a desorbed raw gas desorbed out of components of the raw gas adsorbed by at least one of the reforming catalyst and the carbon monoxide decreasing catalyst.

17. The method of claim 16 further comprising, at a start-up operation of the fuel cell system, estimating the amount of the desorbed raw gas, desorbed out of the components of the raw gas adsorbed from at least one of the reforming catalyst and the carbon monoxide decreasing catalyst and burned by the burner unit, based on at least one of a temperature of the reforming catalyst and a temperature of the carbon monoxide decreasing catalyst.

18. The method of claim 16 further comprising:
measuring a time elapsed since the heating unit starts a heating operation; and
estimating the amount of the desorbed raw gas, desorbed out of the components of the raw gas that are adsorbed in at least one of the reforming catalyst and the carbon monoxide decreasing catalyst and burned by the burner unit.

19. The method of claim 16 further comprising:
activating the raw gas supply device and the heating unit at a start-up operation of the fuel cell system; and
after the burner unit burns the raw gas supplied from the raw gas supply device for a predetermined time period, stopping operation of the raw gas supply device and activating the raw gas supply device after elapse of a predetermined period of time since the heating unit starts a heating operation.

20. The method of claim 16 further comprising:
detecting a concentration of at least one component out of combustion exhaust gas components generated after combustion by the burner unit; and
adjusting the amount of combustion air according to the concentration of at least one component.

* * * * *